Feb. 7, 1950 F. R. LAMBERTY ET AL 2,496,629

COMBINED TELEPHONE AND PAGING SYSTEM

Filed Dec. 16, 1947 14 Sheets-Sheet 1

INVENTORS F. R. LAMBERTY
F. D. NITTERAUER
BY G. F. Kane
ATTORNEY

COMBINED TELEPHONE AND PAGING SYSTEM

Filed Dec. 16, 1947 14 Sheets-Sheet 2

INVENTORS F. R. LAMBERTY
F. D. NITTERAUER
BY A. J. Kane
ATTORNEY

Feb. 7, 1950 F. R. LAMBERTY ET AL 2,496,629

COMBINED TELEPHONE AND PAGING SYSTEM

Filed Dec. 16, 1947 14 Sheets-Sheet 3

FIG. 3 REGISTER CIRCUIT C

INVENTORS F. R. LAMBERTY
F. D. NITTERAUER
BY A. F. Kane
ATTORNEY

INVENTORS F. R. LAMBERTY
F. D. NITTERAUER
BY G. F. Kane
ATTORNEY

Feb. 7, 1950 F. R. LAMBERTY ET AL 2,496,629

COMBINED TELEPHONE AND PAGING SYSTEM

Filed Dec. 16, 1947 14 Sheets-Sheet 5

INVENTORS F.R. LAMBERTY
F. D. NITTERAUER

BY A. J. Kane

ATTORNEY

Feb. 7, 1950 F. R. LAMBERTY ET AL 2,496,629

COMBINED TELEPHONE AND PAGING SYSTEM

Filed Dec. 16, 1947 14 Sheets-Sheet 6

INVENTORS F. R. LAMBERTY
F. D. NITTERAUER
BY A. F. Kane
ATTORNEY

Feb. 7, 1950 F. R. LAMBERTY ET AL 2,496,629

COMBINED TELEPHONE AND PAGING SYSTEM

Filed Dec. 16, 1947 14 Sheets-Sheet 7

INVENTORS F. R. LAMBERTY
F. D. NITTERAUER

BY G. F. Kane

ATTORNEY

COMBINED TELEPHONE AND PAGING SYSTEM

Filed Dec. 16, 1947 14 Sheets-Sheet 8

INVENTORS F. R. LAMBERTY
F. D. NITTERAUER
BY G. F. Kane
ATTORNEY

COMBINED TELEPHONE AND PAGING SYSTEM

Filed Dec. 16, 1947

14 Sheets-Sheet 9

INVENTORS F. R. LAMBERTY
F. D. NITTERAUER
BY G. F. Kane
ATTORNEY

Feb. 7, 1950 F. R. LAMBERTY ET AL 2,496,629

COMBINED TELEPHONE AND PAGING SYSTEM

Filed Dec. 16, 1947 14 Sheets-Sheet 10

INVENTORS F. R. LAMBERTY
F. D. NITTERAUER
BY Q. F. Kane
ATTORNEY

COMBINED TELEPHONE AND PAGING SYSTEM

Filed Dec. 16, 1947 14 Sheets-Sheet 11

INVENTORS F. R. LAMBERTY
F. D. NITTERAUER
BY *A. F. Kane*
ATTORNEY

COMBINED TELEPHONE AND PAGING SYSTEM

Filed Dec. 16, 1947 14 Sheets-Sheet 12

INVENTORS F. R. LAMBERTY
F. D. NITTERAUER
BY G. F. Kane
ATTORNEY

COMBINED TELEPHONE AND PAGING SYSTEM

INVENTORS F. R. LAMBERTY
F. D. NITTERAUER
BY A. F. Kane
ATTORNEY

COMBINED TELEPHONE AND PAGING SYSTEM

INVENTORS F. R. LAMBERTY
F. D. NITTERAUER
BY A. J. Kane
ATTORNEY

Patented Feb. 7, 1950

2,496,629

UNITED STATES PATENT OFFICE 2,496,629

COMBINED TELEPHONE AND PAGING SYSTEM

Frederick R. Lamberty, Rockville Centre, N. Y., and Franklin D. Nitterauer, Minneapolis, Minn.; said Lamberty assignor to Bell Telephone Laboratories, Incorporated, New York, N. Y., a corporation of New York, and said Nitterauer assignor to American Telephone and Telegraph Company, a corporation of New York Application December 16, 1947, Serial No. 791,970

14 Claims. (Cl. 177—353)

1

This invention relates to combined registry and paging systems.

It is the object of this invention to simplify and otherwise improve large capacity combined registry and paging systems of the type which complement, and are coordinated with telephone communication facilities serving large business organizations, hospitals and similar institutions.

In accordance with the present invention combined registry, paging and communication facilities are provided for the key personnel of a large institution, such as a hospital, and the regular private branch exchange switchboard at the hospital is utilized as a control point, at which all locating and oral paging operations are initiated, and as an observation point at which the presence and location in the building of any of the personnel covered by the system may be visually indicated, at the will of the switchboard attendants, through the media of lamp signals. To this end each individual, (doctors, nurses, clinicians, etc.) or registrant covered by the system of this invention is identified at the exchange switchboard by means of an individually allocated lamp signal having multiple appearances at the attendants' positions in the exchange. The lighted condition of such lamps serves to inform the switchboard attendants that the corresponding registrants are on the premises and have placed themselves on call. The darkened condition of such lamps is indicative of the fact that the corresponding registrants either have not registered in or have terminated their stay in the building.

In accordance with a feature of the invention the hospital building is divided into sections, zones, or areas each identified by a numerical designation, and means in the nature of lamp signals located on the exchange switchboard, are provided and are operable in various combinations to identify each of the said sections, zones or areas. More particularly, the section-identifying signals comprise two series of lamps corresponding respectively to the units and tens digits of the two-digit numerical designations assigned to the various sections into which the building is conveniently divided. For example, on the switchboard of a building which is divided into sixty sections, each identified by a two-digit designation, there are provided one series of ten lamps individually corresponding to the units digits 1 to 9 and zero, and a second group of six lamps individually corresponding to the tens digits 1 to 6, inclusive. Any two lamp signals, one in each of the two groups, when simultaneously lighted incident to the completion of a locating operation initiated by an exchange attendant, identify the designation of a particular section, zone or area. For example, the lighting of the No. 5 tens lamp and of the No. 6 units lamp identifies the section No. 56.

2

In accordance with another feature of the invention each registrant covered by this system is assigned a different registry number, such as No. 234, and each section of the building is provided with facilities whereby the registrant may dial his particular registry number as he enters the various sections. In accordance with regulations all registrants are required to dial their registry numbers as they enter any section of the building and as they depart from the building. This dialing operation by a registrant causes the storage, in an individually allocated register circuit, of information pertaining to the section in which the registry number has been dialed. As the registrant progresses through the building and repeats the dialing of his registry number in each section, the information stored in the register circuit is altered so as to pertain to the section in which the registrant has last dialed his registry number. This information is always available to the switchboard attendant and may be translated at the switchboard into a visual indication of the designation of the section last dialed in by a registrant should the attendant have occasion to determine the whereabouts of the particular registrant. When a registrant leaves the building he dials his registry number from the "exit" section, or station, causing his corresponding registry lamp at the private branch exchange switchboard to be extinguished as a signal to the attendant that the registrant is no longer available.

In accordance with a further and related feature of the invention a private branch exchange attendant upon noting the lighted condition of a particular registrant's registry lamp, indicative of the registrant's presence on the premises, may ascertain the location of the registrant by originating a connection at the switchboard and by dialing thereover the registry number of the registrant to be located. This operation, through the medium of a locating connector circuit, translates the information stored in the registrant's individual register circuit into a visual indication of the numerical designation of the section in which the registrant last registered. For example, if the attendant is seeking the location of a registrant whose registry number is "234," she notes whether or not the registrant's registry lamp is lighted and if it is lighted she inserts her cord plug into the jack terminal of a locating connector circuit and dials the digits 2, 3 and 4 corresponding to the registrant's registry number. As a result of this operation and assuming the registrant had last registered in section No. 56, two lamps, the No. 5 tens lamp and the No. 6 units lamp, of the section display lamp equipment mounted on the switchboard light as an indication to the attendant that registrant No. 234 can be reached in section No. 56.

A still further feature of the invention contemplates means whereby a private branch exchange attendant may orally page any registrant in the section in which the registrant last registered. More particularly, the attendant under these circumstances, dials the particular registrant's registry number to control the setting of a paging connector and actuates a paging key to connect a paging transmitter to the connection completed by way of the paging connector. The dialing of the registrant's number causes the paging connector to automatically seize a paging channel or trunk extending to the section in which the registrant has last registered and to render available one or more loudspeaking receivers in the section for the receipt and broadcasting of any paging message she may wish to transmit.

Another feature of the invention contemplates facilities whereby, in an emergency, all sections of the building may be orally paged in simultaneously.

Still another feature of the invention provides means whereby any registrant is automatically paged in the section in which he last registered in response to the initiation of a call to the registrant by anyone having knowledge of the registrant's call number. To this end each registrant is assigned a call number which corresponds to his registry number preceded by the digit "2". Thus the call number of registrant No. 234, for example, is "2—234". When such call number is dialed from a local telephone station by a person desirous of communicating with registrant No. 234, the system functions automatically to visually and/or audibly page the particular registrant in the section in which he last registered.

A related feature of the invention contemplates the provision of means whereby a registrant, after having been automatically visually and/or audibly paged in any section of the building may communicate with the person who instituted the paging operation by dialing, from any convenient station, his own answer number which corresponds to his registry number preceded by the digit "3". This operation results in the completion of a telephone connection between the calling station and the station employed by the registrant in answering the paging call.

Registrants covered by the system of this invention may have fixed or roving assignments in the hospital and certain registrants having roving assignments may also have a telephone allocated to them. In this latter case a registrant may spend a considerable portion of his time in the hospital at one location and the remaining portion in visiting various sections of the building. The one location at which a considerable portion of the registrant's time is spent would be furnished with a telephone which is individually allocated to the registrant. In accordance with a still further feature of the invention provision is made whereby all calls directed to such a registrant will be received at the location equipped with the registrant's telephone, unless the registrant, upon leaving this location, preconditions his line circuit in such a manner that the incoming call manifests itself in a visual and/or audible paging of the called registrant in the section of the hospital in which he last registered.

A further feature of the invention enables a private branch exchange attendant to "silently page" any registrant who has placed himself on call. In accordance with this feature each dialing station is provided with a register lamp which is lighted at the conclusion of a dialing operation by a registrant as an indication that the equipment has functioned to register his location. This lamp ordinarily is lighted steadily. In order to "silently page" a registrant the private branch exchange attendant operates a flash key associated with the register lamp corresponding to the registrant to be paged. This operation substitutes a source of intermittent ground for the steady ground in the circuit which controls the operation of the register lamp at the dial stations so that when the registrant next dials from a dial station the register lamp thereat, instead of lighting steadily, will flash as an indication to the registrant that the private branch exchange attendant wishes him to contact her. By operating a flash key before a registrant has checked in the registrant will be silently paged as soon as he registers at the entrance.

These and other features of the invention will be better understood from the following detailed description when read in connection with the accompanying drawings in which:

Fig. 1 illustrates a registry selector circuit A which is individual to a building section, zone or area, such as section No. 56, and which is seized when a registrant operates a section dial 100 in accordance with his, or her, three-digit code, or registry number. To the left of the figure is shown a section dial circuit which includes the dial 100, a busy lamp signal 101, and a register lamp 121. The lamp 101 provided with a red cap, operates when the section dial is moved off normal. In practice there may be more than one section dial circuit for each section and the lamps 101 thereof are connected in multiple so that when the dial at any station in the same section is moved off normal the lamp 101 at each dial station of the section will be lighted to indicate, at each dial station, that the register equipment individual to the section is in use. In the upper left portion of the drawing are shown loudspeakers 127 and 128 and a section amplifier 129 connected to the section paging channel, or trunk PL over which registrants may be audibly paged in the section No. 56. At 132 is shown an indicator which is used to display, in section No. 56, the code or registry numbers of the registrants when such registrants are visually paged in section No. 56.

Fig. 2 shows a registry connector circuit B which serves two hundred register circuits C (Fig. 3). While but one registry connector, serving a group of two hundred register circuits, is shown it is to be understood that a plurality of such circuits is provided in practice and serve the same group of register circuits so that it is reasonably certain that a registrant will, at all times, have access to an idle connector serving the group in which the registrant's register circuit C appears. A relay lock-out chain circuit comprising such relays as 213, 209, 240 and 241, is provided so that if two or more registrants dial simultaneously the registrations will be set up in the register circuits one at a time. A relay 222 is multipled to all registry selectors A having the same units digit except the switch controlled from the exit station. This relay serves to identify, in the cross bar switch CB of the individual register circuits, the units digit of the section at which a registrant is registering.

Fig. 3 illustrates a single register circuit C, there being one such circuit for each registrant having a roving assignment. Such a circuit employs several relays 302, 303, and 304 and a vertical on a cross bar switch CB to register the numerical designation of the section from which the corresponding registrant is dialing. Relays 302, 303 and 304 serve to register the tens digit of the section designation and are operated in various combinations by a relay, such as relay 115, in the registry selector or section switch A. The units digit of the section designation is registered in the cross bar switch CB by means of a hold magnet 305 and one of ten select magnets such as 224, the latter being controlled from the relay 222 and the former from a relay 301 which identifies the terminal appearance of the register circuit C in the register connector circuit B. The hold magnet 305 and select magnet, such as 224, function in the well-known manner to cross-connect switch points such as are indicated at 308 and 309. The hold magnet 305 and the particular combination of relays 302, 303 and 304, operated, are locked under control of relay 301 so that a section registration is stored in the register circuit until the registrant again registers from a different section. The information in the register circuit is thus stored for subsequent use in locating and paging the particular registrant to whom the register circuit C is allocated.

Fig. 4 shows a locating connector LC by means of which a private branch exchange attendant may automatically locate a registrant in the section in which he last registered; a paging connector PC by means of which the attendant may orally page selectively in any section; an emergency paging circuit EP by means of which an attendant may page in all sections simultaneously; section display lamps at the attendant's position which are controlled from the locating connector LC and serve to visually identify the section in which a registrant has last registered; and a display relay circuit which controls the operating circuits for the section display lamps.

Figure 1:
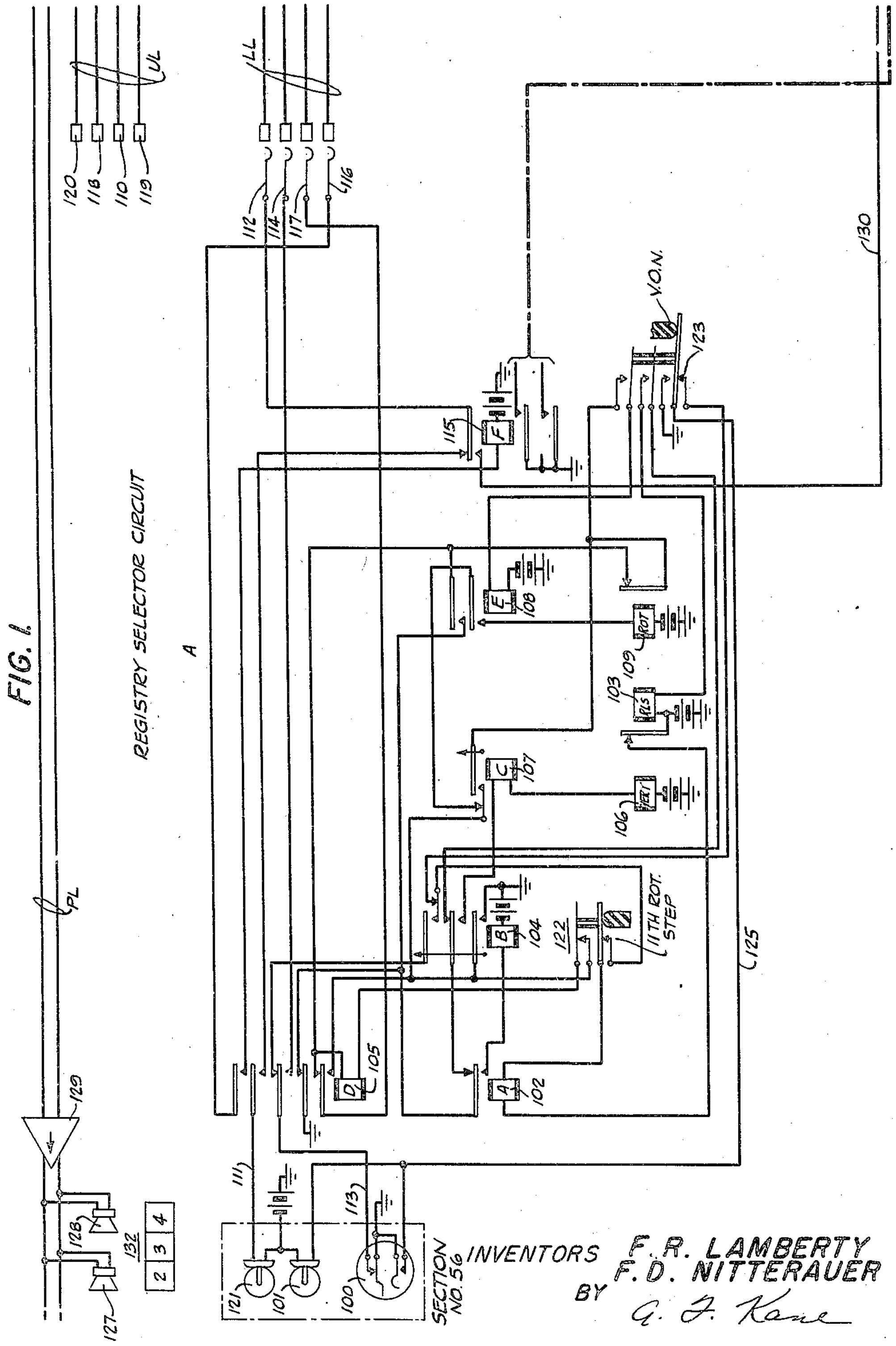

In the detailed description which follows, it is assumed that the combined registry and paging system disclosed in the drawings is installed in a large hospital which is conveniently divided into sixty separate sections, zones or areas, into some or all of which the members of the hospital personnel, such as doctors, nurses, clinicians, etc., are called upon to visit during their tours of duty in the institution. A number of these members will progress from section to section and are said to have roving assignments while others may be located in one section during their stay in the institution and are said to have fixed assignments. The sixty sections into which the hospital is divided include an entrance section, conveniently situated in the hospital lobby, or in some other location through which all members of the hospital personnel enter the building, and an exit section through which the members pass when leaving the building. Each member of the personnel who is is covered by the combined registry and paging system is assigned a registry number consisting of three digits and as a registrant enters each section he is obliged to dial his registry number. For the convenience of the registrants each is provided with one or more suitably located wall type telephone dials by means of which the registrant may dial his registry number. Located at each dial station are two signal lamps one a "section busy" lamp and the other a "register" lamp. Moving the dial off normal lights the section busy lamp at each of the dial appearances in the section to indicate to other registrants that the particular section equipment is busy. The lighting of the register lamp after the dialing operation has been completed serves to appraise the registrant that the registration has been recorded.

In the following description it will be assumed further that a registrant who has been assigned the registry number "234" has entered the institution and after having dialed his number in the entrance section, has passed through a number of other sections repeating the dialing operation in each section and has now entered section No. 56. As a result of the first dialing operation in the lobby of the building the register lamp 300 shown in the drawings associated with the registry circuit (Fig. 3) which is individually allocated to registrant No. 234, will be lighted at the private branch exchange switchboard, thus indicating to the attendants thereat that registrant No. 234 has registered and placed himself on call. At each succeeding dialing operation by registrant No. 234 the lamp 300 will be momentarily extinguished and then relighted. This lamp is controlled by a hold magnet 305 associated with register circuit C individually allocated to registrant No. 234 and this magnet, among other functions, serves to store information, in a cross bar switch CB and in relays 302, 303, and 304, pertaining to the section in which registrant No. 234 has last registered. In the present assumed case, the registrant No. 234 is to register in section No. 56 after having last registered in section No. 55, for example. Under this condition magnet 305 will be operated as will also lamp 300 and relays 302 and 304, which relays, as will appear presently, serve, when operated together, to identify the tens digit "5" of section No. 55 at which the registrant last registered.

*Registrant No. 234 registers in section No. 56*

Upon entering section No. 56 registrant No. 234, in accordance with hospital regulations, proceeds to the nearest dial station and actuates the dial 100 in accordance with his register number. As soon as the dial 100 is moved off normal the section busy lamp 101 is lighted in an obvious circuit. All other section busy lamps (not shown) in section No. 56 are also lighted in multiple with lamp 101 to indicate to other registrants who may wish to register from the same section that the section equipment is busy and they should wait until it becomes idle.

Relay 102 in the register selector circuit A, which is individual to section No. 56, operates in a circuit extending from grounded battery, armature and back contact of release magnet 103, winding of relay 102, lower normal contacts of spring switch 122, normal make-before-break contacts of relay 104, contacts 123 of vertical off-normal switch VON, conductor 125, off-normal contacts of dial 100, to ground. At its front contact and armature relay 102 completes an obvious operating circuit for slow-to-release relay 104 which circuit finds ground at the back contact and second armature of relay 105.

Relay 104, operated, opens the original energizing circuit for relay 102 and places relay 102 under the control of the pulsing contacts of dial 100. The pulsing circuit may be traced from the alternate make-before-break contacts of relay 104, to ground at the pulsing contacts of dial 100 by way of the third armature and back contact of relay 105 and conductor 113. At its middle armature and front contact relay 104 prepares an operating circuit for vertical magnet 106, which includes battery and ground, windings of vertical magnet 106 and of relay 107, front contact and middle armature of relay 104, back contact and armature of relay 102, back contact and second armature of relay 105 and ground.

As the dial 100 is released and returns to normal, the pulsing contacts thereof are interrupted twice in accordance with the hundreds digit "2" of the registrant's registry number 234. Relay 102 follows the dial pulses and at each interruption of the pulsing contacts vertical magnet 106 is operated in series with relay 107. The vertical magnet accordingly operates twice to step the registry selector switch A to the second level in the multiple bank. Relays 104 and 107 are slow to release and hold operated between dial pulses, relay 107 operating on the first impulse from the dial.

On the first vertical step of the shaft of the registry selector A the vertical off-normal springs VON are operated in the well-known manner. At the lowermost alternate contacts thereof ground potential is connected to the conductor 125 which is connected to battery and ground through the filament of lamp 101 so as to maintain the section busy lamps, such as lamp 101, lighted. At the middle alternate contacts of springs VON an operating circuit for release magnet 103 is prepared, and at the uppermost alternate contacts of switch VON an operating circuit for relay 108 is completed. This circuit may be traced from grounded battery, winding of relay 108, uppermost contacts of switch VON, armature and front contact of relay 107, innermost armature and front contact of relay 104 to ground. Relay 108, operated, prepares an operating circuit for rotary magnet 109.

At the completion of the dialing of the digit "2," relay 107 and vertical magnet 106 are deenergized. With relay 107 released relay 108 remains locked up under control of the rotary magnet 109. The locking circuit for relay 108 may be traced from grounded battery, winding of relay 108, uppermost alternate contacts of switch VON, armature and back contact of rotary magnet 109, uppermost armature and front contact of relay 108, to ground by way of the back contact and second armature of relay 105. Relay 107, released, completes the operating circuit for rotary magnet 109 which extends from grounded battery, over the winding of rotary magnet 109, front contact and inner armature of relay 108, normally closed contacts of relay 107, innermost armature and front contact of relay 104 to ground.

The operation of rotary magnet 109 causes the registry selector A to hunt for an idle registry connector such as B, in the well-known manner. Relay 108 releases upon operation of magnet 109. If the first connector is busy the sleeve terminal 110 corresponding thereto will have ground potential connected thereto from the second armature and front contact of relay 200 of the busy connector. This ground shunts the winding of relay 105 which is in series with the winding of relay 108, thereby preventing relay 105 from operating while permitting relay 108 to reoperate. When relay 108 reoperates, the rotary magnet 109 is again energized and reoperates. This reoperation of magnet 109 continues until an idle sleeve terminal is encountered by the corresponding selector brush 117. When this occurs the absence of ground potential permits relay 105 to energize in series with the winding of relay 108. Relay 105 operates but relay 108 does not operate since it now receives insufficient current.

Assuming that the illustrated connector (Fig. 2) is idle, the selector brushes 112, 114, 117 and 116 will come to rest on the corresponding bank terminals 120, 118, 110 and 119, respectively. With relay 105 operated, as described, the conductor 111 is extended over the fourth armature and front contact of relay 105 and over the back contact and upper armature of relay 115 to selector brush 112, while conductor 113 is extended to the brush 114 over the third armature and front contact of relay 105. At its outermost armature and front contact relay 105 connects one terminal of the winding of relay 115 to the selector brush 116. At its third armature relay 105 opens the operating circuit to relay 102 so that this relay releases. Relay 102 releases relay 104 which prepares the release magnet 103 for operation. Relay 104 remains operated for a short interval of time and holds ground potential connected to the selector sleeve brush 117.

It is to be understood at this time that the first level of selector bank terminals LL is assigned to connectors serving the first hundred registrants, that is, registrants whose registry numbers are 100, 101, . . . 199, and the second level UL is assigned to connectors serving the second hundred registrants whose registry numbers are 200, 201, . . . 299, so that when the digit "2" of the registry number 234 is dialed the selector switch brushes 112, 114, 117 and 116 will engage the corresponding bank terminals of the upper level UL. The registry selector circuit of Fig. 1 thus serves two hundred lines.

Relay 201 in the seized registry connector B now operates in series with brush-selecting relay 202 in a circuit which may be traced from grounded battery, winding of relay 201, left winding of relay 202, bank terminal 118, brush 114 of selector A, front contact and third upper armature of relay 105, conductor 113, pulsing contacts of dial 100, to ground. Relay 201, operated, causes slow-to-release relay 200 to operate in an obvious circuit which includes the terminal strappings and brush of time switch TS.

The length of time any registrant may hold a registry selector switch is limited to several seconds and may be varied by changing the strapping of contacts on the time switch TS. As long as relay 200 is operated, ground potential is intermittently applied to the winding of rotary magnet 229 to cause the magnet 229 to operate accordingly and step the time switch. The operating circuit for magnet 229 may be traced from grounded battery, winding of magnet 229, back contact and left armature of relay 228, right armature and front contact of relay 200, interrupter 227 and ground. Rotary magnet 229, under control of interrupter 227, advances the brush of timing switch TS one step per second toward the unstrapped bank contacts. If the various subsequent registration operations are not completed in the allotted time the time switch opens the operating circuit for relay 200 and causes the release of the selector in the following manner. With relay 200 released, ground is removed from the sleeve terminal 110 which ground was holding relay 105 operated. When this ground is removed from the selector sleeve terminal, relay 105 releases and causes release magnet 103 to operate. The operation of release magnet 103 permits the selector shaft to return to normal position in well-known manner. When the selector shaft reaches its normal position, the circuit to release magnet 103 is opened at the middle alternate contacts of vertical off-normal springs VON, and the circuit to the section busy lamp 101 is opened at the lowermost alternate contacts of springs VON. Lamp 101 at the dial station of section No. 56 is thus extinguished as are also the corresponding lamps at other dial stations in the same section.

When relay 200 operated, as previously described, ground at its outermost left armature and front contact is connected to the sleeve terminal 110 of selector switch A and thence over the sleeve 117 to hold relay 105 operated. Ground at the middle left armature and front contact of relay 200 serves as a holding ground for the brush selecting relay 202 which relay is locked operated over its lower winding, front contact and first armature.

Assuming that the switch TS does not time out to release selector A, the registrant dials the second digit "3" of his register number "234." Relay 201 releases on each interruption of the dial contacts and upon each release thereof the vertical magnet 203 operates in a circuit extending from grounded battery, over winding of magnet 203, winding of relay 204, contacts 205 of vertical off-normal switch VON, front contacts and innermost left armature of relay 200 to ground by way of the back contact and armature of relay 201. Vertical magnet 203, operating, causes the connector switch shaft to rise one step each time relay 201 releases. Thus the switch shaft is stepped up three steps in response to the dialing of the digit "3." Relay 204 operates in series with the vertical magnet 203 and, at its armature and front contact maintains the continuity of the pulsing circuit when the vertical off-normal switch VON operates on the first vertical step of the switch shaft by transferring the conductor extending from the back contact of the pulsing relay 201 from contacts 205 to contacts 206 of the springs VON.

When the three pulses representing the digit "3" of the registry number "234" have been dialed and the connector B has been stepped up to the third level, relay 204 releases and transfers the pulsing circuit to the rotary magnet 207 through the winding of relay 208. Relay 201 then follows the dial pulses resulting from the dialing of the third digit "4" of the registrant's number "234" and causes the rotary magnet 207 to operate and to rotate the switch shaft four steps. Relay 208 holds operated during the rotary pulsing. The connector brushes 226, 217 and 221, which were selected when relay 202 operated, now rest upon corresponding terminals 227, 216 and 220 which are associated with register circuit C individually allocated to registrant No. 234.

When the rotary pulses cease, relay 208 releases and at its inner armature and back contact establishes a circuit from grounded battery, over resistance 210, rotary off-normal contacts 211, lower armature and back contact of relay 212, winding of chain relay 209, to ground by way of the lower normal contacts of chain relay 213. Relays 213, 209, 240 and 241 constitute a chain circuit which is provided so that if two or more registrants should dial simultaneously, the registrations will be set up on the cross bar switches, one of which is shown at CB (Fig. 3), one at a time. Relay 209 operates in the circuit previously traced and causes relay 230 to operate in a circuit extending from grounded battery, winding of relay 230, front contact and upper armature of relay 209, upper back contacts and armatures of all the preceding chain relays, such as relays 240 and 241 to ground.

Upon seizure of the registry circuit C in the manner described, relay 301 associated therewith operates in a circuit traced from grounded battery, over winding of relay 301, connector bank terminal 216 and corresponding brush 217, front contact and third armature of relay 202, back contact and inner upper armature of relay 212, front contact and third armature of relay 230 to ground. When relay 230 operated as previously described, relay 115 in the registry selector circuit A operated in a circuit which may be traced from grounded battery, winding of relay 115, front contact and outermost armature of relay 105, selector brush 116 and corresponding bank terminal 119, second armature and front contact of relay 230 to ground.

Relay 301, operated, opens the holding circuit for hold magnet 305 and transfers its circuit to the front contact of select magnet 224 by way of conductor 225. As hereinbefore indicated, hold magnet 305 would have been operated due to the registrant's previous registration in section No. 55; relays 302 and 304 would also have been operated and held operated under control of hold magnet 305. These relays and magnet operations had caused to be stored in the cross bar switch CB information to the effect that registrant No. 234 had last registered in section No.

55. Now, in response to the registrant's dialing his registry number at a new section, section No. 56, hold magnet 305 is deenergized, as described, and causes the release of relays 302 and 304. The release of these switching devices is necessary in order that the information as to the location of the registrant's number "234" which is stored in the registry circuit C may be changed in accordance with his new location in section No. 56.

At its outermost armature and front contact, relay 301 causes grouping relay 218 to operate in an obvious circuit. At its second, third and fourth armatures and front contacts relay 301 connects the operating windings of relays 302, 303 and 304 to the armatures of grouping relay 218. With relays 301, 115 and 218 operated, relays 302 and 304 reoperate from ground at the lower armatures of relay 115. Since the registry selector circuit A is allocated to a section in the 50-group of sections which includes section No. 56, relay 115 is provided with but two armatures for the control of "tens" relays 302, 303 and 304 of the registry circuit C so that only relays 302 and 304 are operated to record the tens digit "5" of the section No. 56 at which registrant No. 234 is registering. This information is stored in the registry circuit for subsequent use in locating registrant No. 234 as will be described hereinafter. Relays 302, 303 and 304 are controlled from the various registry selector circuits, or section switches A in such a manner that if the registrant is dialing from a section whose tens digit is "1" only relay 304 is operated; if from a section the tens digit of which is "2" only relay 303 is operated; if from a section whose tens digit is "3," relays 303 and 304 are operated; if from a section whose tens digit is "4," only relay 302 is operated; if from a section whose tens digit is "5," both relays 302 and 304 are operated; and finally, if from a section whose tens digit is "6," relays 302 and 303 are operated. The relays 115 of the various section switches A will, of course, be provided with one or two lower armatures depending upon the section to which their corresponding switches are allocated, and their armature contacts will be connected to the armature contacts of grouping relay 218 in predetermined combinations to cause corresponding operations of relays 302, 303 and 304 incident to the seizure of a corresponding section switch A.

In the present case in which registrant No. 234 is dialing from section No. 56, relays 302 and 304 are operated as previously indicated. When hold magnet 305 released incident to the operation of relay 301, relay 219 in the registry connector B operated in a circuit traced from grounded battery, winding of relay 219, front contact of innermost armature of relay 230, outermost armature and front contact of relay 202, connector brush 221 and the corresponding bank terminal 220, back contact and inner armature of hold magnet 305, to ground. At its outer armature hold magnet 305 opens the circuit to the registry lamp 300 causing this lamp, which is located at the private branch exchange switchboard to be extinguished. This darkened condition of the register lamp 300, which lamp is assigned to registrant No. 234 will be altered immediately so as to be relighted as will appear as the description progresses.

When relay 219 in the connector B operated, relay 222 operated in a circuit extending from grounded battery, resistance 223, upper armature and front contact of relay 219, front contact and outermost upper armature of relay 230, selector terminal 120 and brush 112, upper armature and front contact of relay 115, conductor 130, to ground through the winding of relay 222.

Relay 222 controls the operation of ten cross bar switch select magnets such as 224, each of which corresponds to the units digit of the section to which the register selectors such as selector A are allocated. The operation of relay 222 in the present case causes the operation of select magnet 224 which identifies the units digit "6" of the section No. 56. It is the combination of select magnet 224 and hold magnet 305 which supplies information to the registry circuit C as to the units digit of the numerical designation of the section in which registrant No. 234 is dialing his registry number. The hold magnet 305 now reoperates in a circuit which is traced from grounded battery, winding of hold magnet 305, front contact and first armature of relay 301, conductor 225, front contact and armature of select magnet 224, to ground. At its outer armature hold magnet 305 causes register lamp 300 to be relighted. At its inner armature and front contact hold magnet 305 completes a locking circuit for relays 302 and 304.

Relay 212 in the connector circuit B now operates in a circuit which may be traced from grounded battery, winding of relay 219, front contact and inner armature of relay 219, winding of relay 212, front contact and middle armature of relay 200, it being understood that the reoperation of relay 305 removes the short circuit from relay 212 which then operates in series with relay 219 as described.

Relay 209 in the connector chain circuit now releases since its holding circuit is opened at the back contact and lower armature of relay 212; relay 301 also releases since its operating circuit is opened at the back contact and inner upper armature of relay 212. Relay 301, released, releases relay 218 and opens the operating circuits to relays 302 and 304 which relays are now held operated under the control of hold magnet 305, it being understood that when relay 301 releases, the locking circuit for hold magnet 305 is reestablished.

Figure 3:
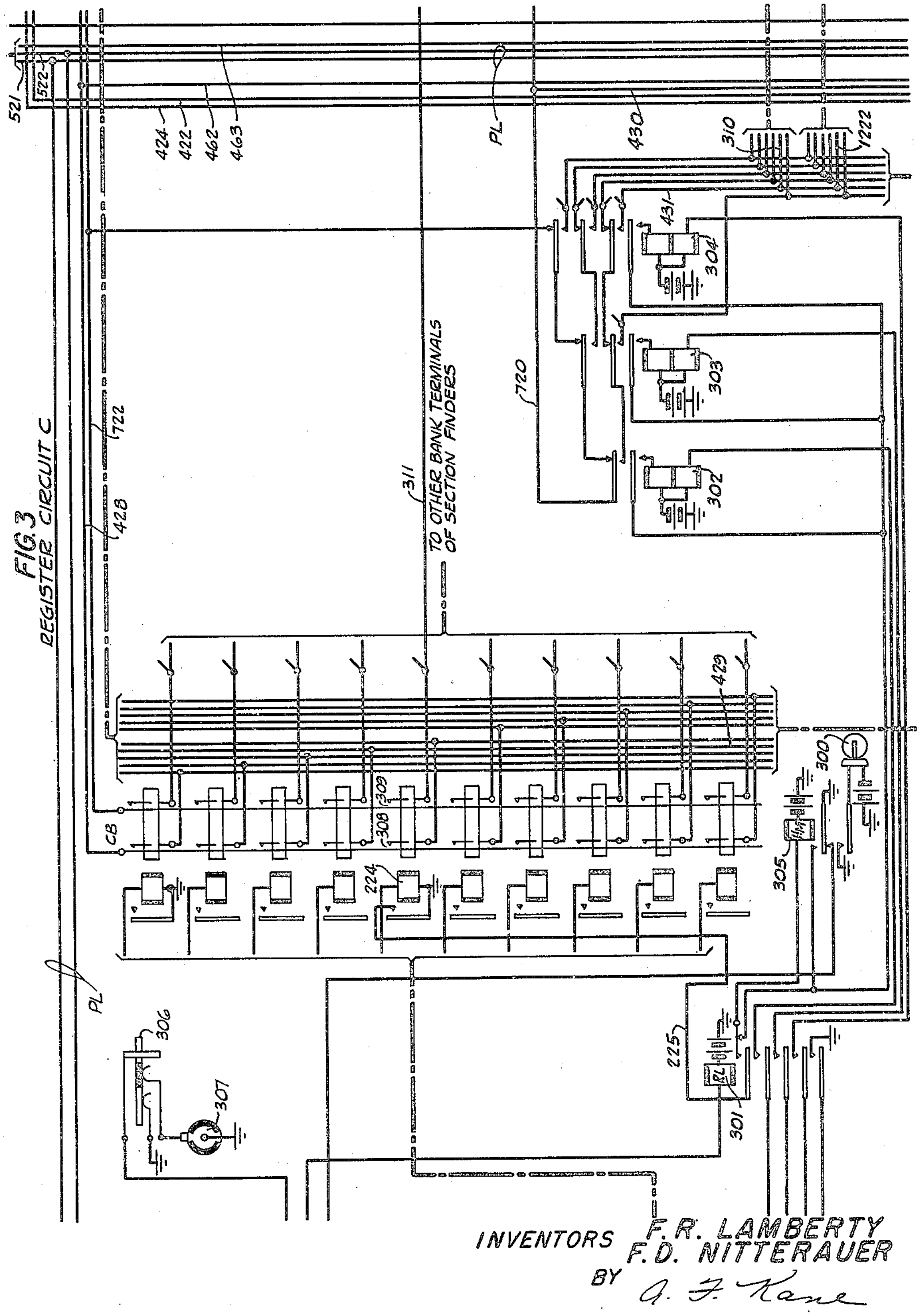

The release of chain relay 209 causes relay 230 to release and to open the operating circuit to relay 115 and to relay 222, these relays thereupon releasing their armatures. Relay 222, released, releases the select magnet 224 (Fig. 3). With relay 115 in the section switch A released, the register lamp 121 is lighted in a circuit extending from grounded battery, filament of lamp 121, conductor 111, fourth upper armature and front contact of relay 105, back contact and upper armature of relay 115, selector brush 112 and terminal 120, outermost armature and back contact of relay 230, outer upper armature and front contact of relay 212, second lower armature and front contact of relay 202, connector brush 226 and terminal 227, key 306 to steady ground. The lighting of lamp 121 at this time indicates to registrant No. 234 that the registration has been completed.

During the dialing of the code 2—3—4 from section No. 56 the timing switch TS associated with the registry connector circuit continues to operate under control of rotary magnet 204 just so long as relay 200 is held operated. When the dialing operation has been completed the switch TS continues stepping until its brush moves onto an unstrapped terminal. When this occurs the operating circuit for relay 200 is opened and relay 200 releases and removes ground from the sleeve terminal 110 of the selector A which heretofore held relay 105 operated. Relay 105 thereupon releases. At its outermost upper armature relay 105 opens the circuit to the register lamp 121, causing this lamp to be extinguished. At the third upper armature and front contact of relay 105 ground from the pulsing contacts of dial 100 is removed from the selector brush 114 causing connector relay 201 to restore. A circuit is now established extending from ground, armature and back contact of relay 201, first left armature and back contact of relay 200, contacts 235 of switch VON, winding of connector release magnet 234, to battery and ground through the left winding of relay 228. The release magnet 234 functions in the well-known manner to restore connector B to normal.

The time switch release magnet 233 operates over its winding by way of the rotary off-normal spring contact 232 and the right armature and front contact of relay 228. Release magnet 233 functions to restore the time switch TS to normal and when the switch reaches its home position the off-normal contacts 232 are opened to interrupt the circuit to the release magnet 233.

When relay 105 in the selector A restored, it completed an operating circuit for release magnet 103 which may be traced from grounded battery, winding of release magnet 103, middle alternate contacts of the selector vertical off-normal springs VON, back contact and middle armature of relay 104, back contact and armature of relay 102, back contact and second upper armature of relay 105 to ground. Release magnet 103 thus operates to allow the selector switch shaft to restore to normal. When this occurs release magnet 103 is deenergized due to the opening of the middle alternate contacts of the vertical off-normal springs VON. Thus the circuits and apparatus involved in the registration operation just described are restored to normal with only the hold magnet 305 and relays 302 and 304 in the register circuit C (Fig. 3) remaining operated.

With hold magnet 305 and relays 302 and 304 operated, the register circuit C has stored therein information to the effect that registrant No. 234 has last registered in section No. 56. It is to be understood that select magnet 224 and the hold magnet 305 operate in the well-known manner to cross connect a particular point, or points, in the cross bar switch CB which is individual to registrant No. 234. The information thus stored is retained until the registrant registers in another section, at which time the cross bar switch CB and a combination of relays 302, 303 and 304 will be so operated as to indicate the new location of the registrant. The information stored in the register circuit C is utilized for various purposes as will appear from descriptions to be made hereinafter.

*Silent paging*

Figures 14, 15:
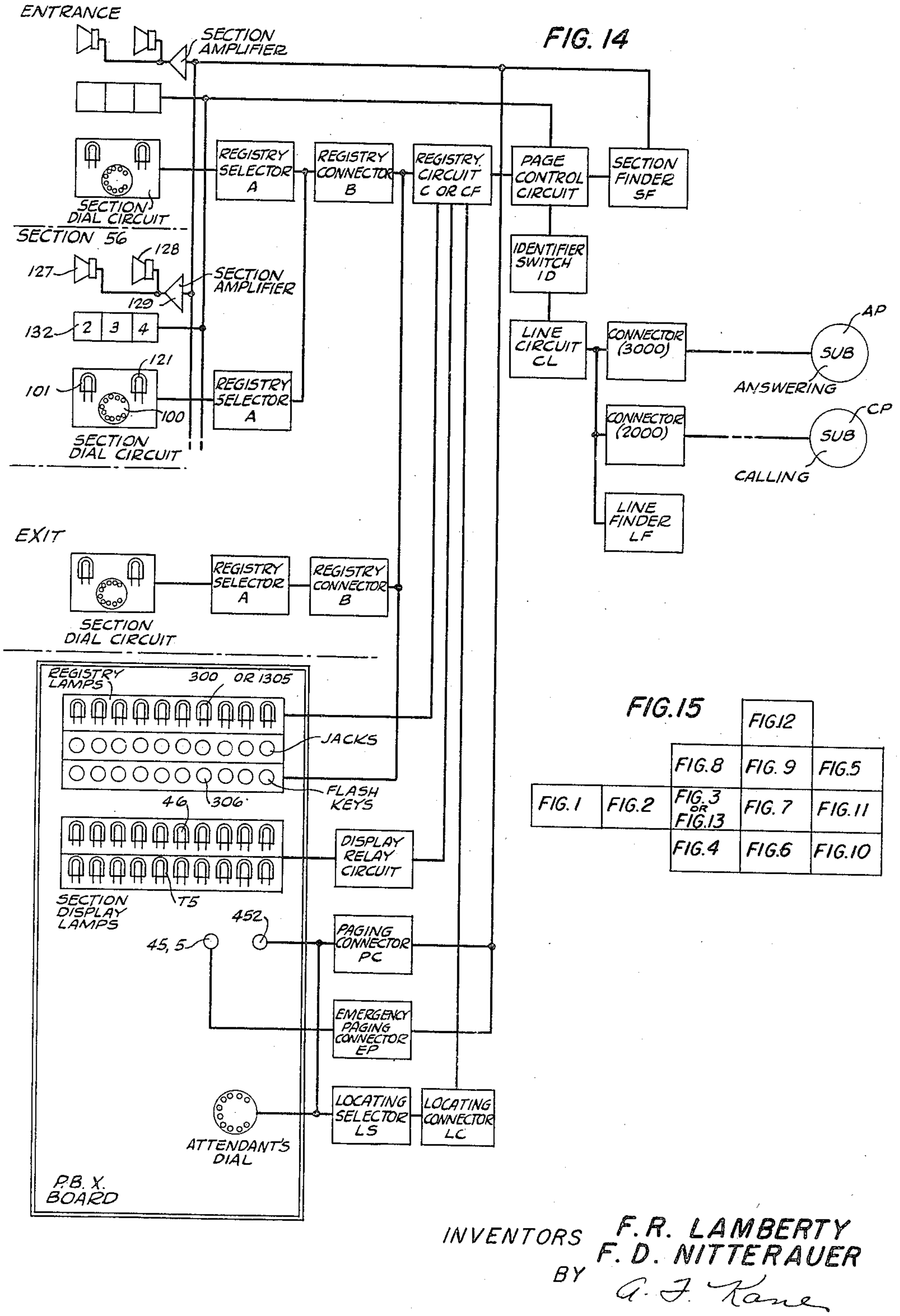
Fig. 14 is a schematic illustration which provides an over-all picture of the combined registry and paging system of this invention and of the various circuits which it includes.
Fig. 15 is a block diagram showing how the several figures of the drawing are to be assembled to effect a complete working system.

It may be desirable at times to notify a registrant that a message for him is being held by the private branch exchange attendant. The nature of the message may not be so urgent that immediate contact with the registrant is required. In such a case the attendant would operate a flash key located on the switchboard and associated with the registry lamp corresponding to the particular registrant who is to be paged. Assuming it is registrant No. 234 who is to be silently paged, the flash key 306 associated with lamp 300 would be operated by the attendant. This key, as shown in Fig. 14, is located on the switchboard at the attendant's position below the lamp 300 which is assigned to registrant No. 234.

It will be observed by referring to Fig. 3, that key 306, in its normal position, connects steady ground to the connector terminal 227 which corresponds to the appearance of the No. 234 registrant's register circuit C in the connector switch B and that, in its alternate position, it substitutes interrupted ground for the steady ground. Interrupter 307 is provided for this purpose. It will be recalled that lamp 121 in the section dial equipment at section No. 56 was lighted when the described registration was completed. The energizing circuit for lamp 121 extended from grounded battery, filament of lamp 121, conductor 111, outermost upper armature and front contact of relay 105, back contact and upper armature of relay 115, brush 112 and bank terminal 120 of selector A, uppermost armature and back contact of relay 230 in the connector B, outer upper armature and front contact of relay 212, second armature and front contact of relay 202, brush 226 and bank terminal 227 of connector B, contacts of key 306 to ground. With key 306 in its alternate position lamp 121 is caused to operate intermittently. This distinctive operation of lamp 121 serves to advise the registrant that a message is being held for him at the private branch exchange switchboard. He may then communicate with the attendant by employing any nearby telephone and receive the message.

It is apparent from the foregoing description that the only act required of the private branch exchange attendant to silently page any one of the registrants covered by the system of this invention is the operation of the flash key, such as 306, which is associated with the registry lamp assigned to the registrant to be paged. This operation merely substitutes intermittent ground for steady ground on the connector terminal corresponding to the register circuit C allocated to the registrant to be paged so that, when the registrant subsequently registers from any section, the registry lamp 121 at the section dial station will flash intermittently instead of operating steadily.

*Locating registrant*

If it is desirable to ascertain the whereabouts of a particular registrant without paging him, an attendant at the private branch exchange may do so in the following manner. It will be assumed that registrant No. 234 who has last registered in section No. 56 is to be located.

Figure 4:
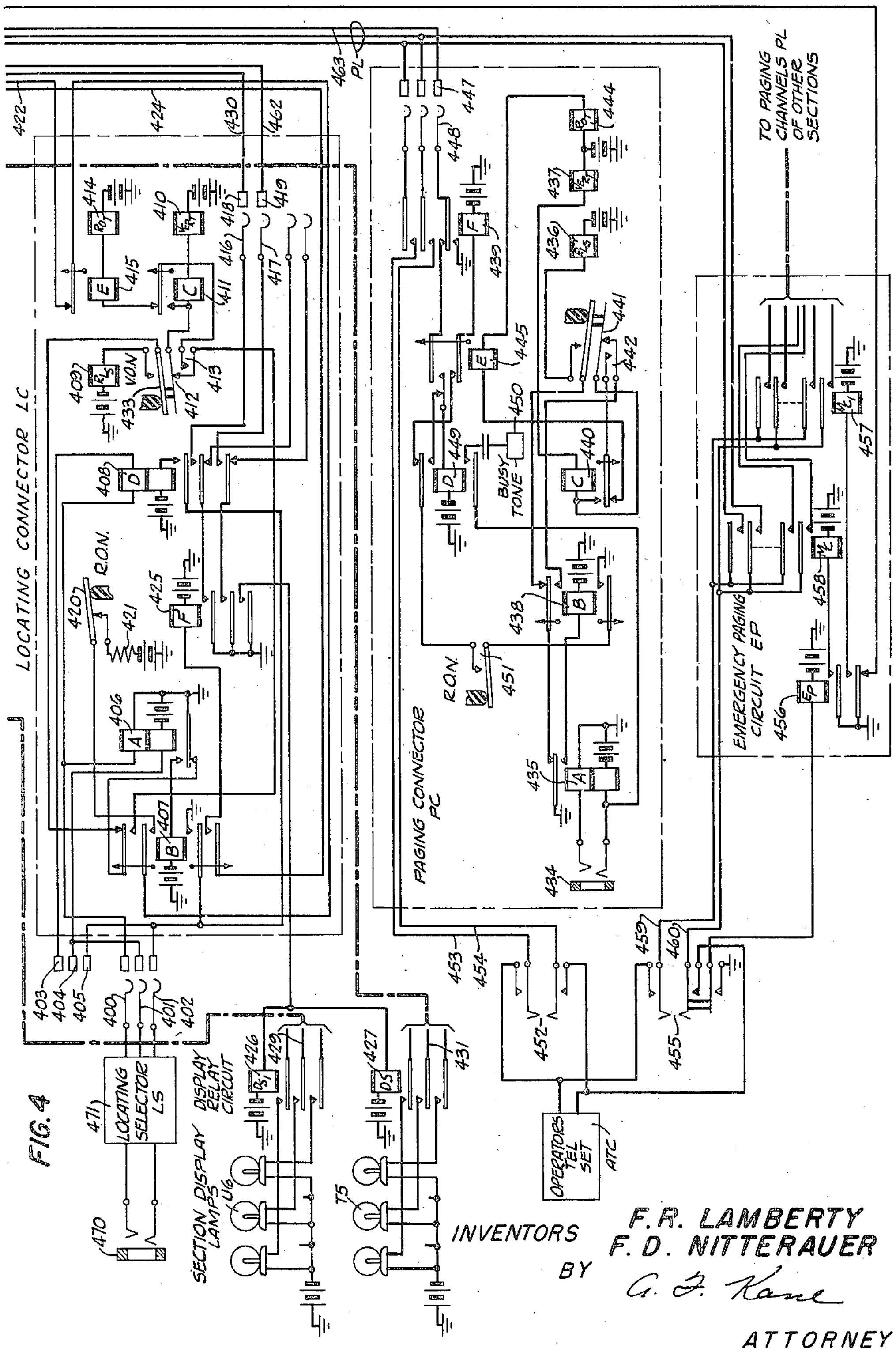

The private branch exchange attendant inserts her cord plug into a jack 470 (Fig. 4) located on the switchboard and identified with a locating selector LS, such as is schematically represented by the block 471 in Fig. 4, and dials the registry number "234" of the registrant whose location is sought. The locating selector LS may be of any well-known type which responds to the dialing of the first digit to automatically seize an idle locating connector LC. Dialing the digit "2" causes the locating selector LS to operate and seize an idle locating connector LC in the well-known manner, the seized connector being one in the second level of bank terminals. When the selector brushes 400, 401 and 402 come to rest upon the bank terminals 403, 404 and 405 respectively, relay 406 operates in the well-known manner. At its lower armature, relay 406 causes slow-to-release relay 407 to operate in an obvious circuit.

Relay 408, which is a brush selecting relay operates in series with relay 406 over its upper winding and locks over its lower winding to ground at the outer lower armature and front contact of relay 407, which ground is also connected to the sleeve terminal 405 to hold the selector switch LS in its operated position. At its outer upper armature and back and front contacts relay 407 opens the circuit to release magnet 409 and prepares a circuit for the vertical magnet 410, respectively. At each interruption of the attendant's dial as the tens digit "3" of the registrant's number "234" is dialed, relay 406 releases and operates the vertical magnet 410 in series with relay 411, relay 411 operating on the first pulse from relay 406. The operating circuit for magnet 410 and relay 411 extends from grounded battery, through the windings of these devices, contacts 412 of the vertical off-normal springs VON, front contact and outer upper armature of relay 407, back contact and armature of relay 406 to ground. The vertical magnet 410 steps the connector switch shaft and brushes up to the third level. Relays 407 and 411 are slow releasing and hold operated on dial interruptions. On the first vertical step of the switch shaft, the off-normal springs VON operate and transfer the pulse circuit from contact 412 to contact 413 but relay 411, being operated, retains the pulse circuit through the vertical magnet 410 during the dialing of the digit "3".

When the pulses from relay 406 cease, relay 411 releases and transfers the pulse circuit from the vertical magnet 410 to the rotary magnet 414. On the next series of four pulses from the attendant's dial relay 406 operates the rotary magnet 414 in series with relay 415, relay 415 operating on the first impulse. Relay 415 is slow to release and holds operated during pulsing. The rotary magnet 414 steps the connector brushes around to the terminal which identify the register circuit C which is individually allocated to registrant No. 234. The brushes 416 and 417 now rest upon the bank terminals 418 and 419, respectively, which connect with the register circuit C by way of conductors 430 and 462, respectively.

Figure 9:
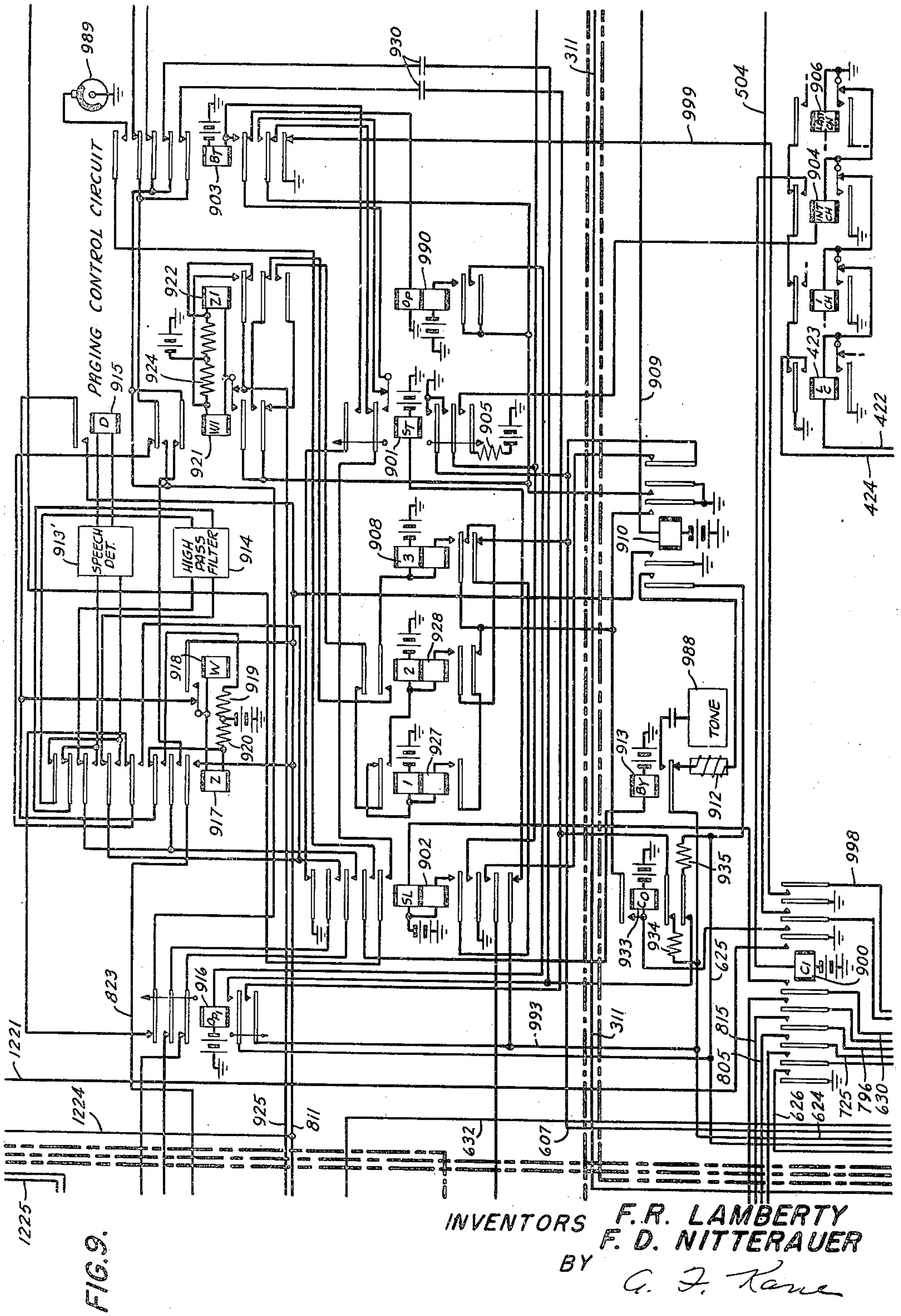

It will be observed that when the locating connector LC took the first rotary step, the rotary off-normal spring 420 connected grounded battery through resistance 421 to the front contact and inner upper armature of relay 407 and thence over the armature and back contact of relay 415 to the chain start conductor 422, it being understood that relay 415 releases a short interval after the connector brushes engage the terminals of the register circuit C. This causes relay 423 in the chain circuit (Fig. 9) to operate provided no other relay in the chain is operated. Relay 423 locks to ground by way of its lower armature and front contact and, at its upper armature and front contact connects ground to conductor 424 which extends over the outer lower armature and front contact of relay 407 to battery and ground through the winding of relay 425. Relay 425 operates in this circuit and at its first and second armatures and front contacts connects ground potential to the connector brushes 416 and 417 which now rest on the terminals 418 and 419, respectively, of register circuit C. At its lowermost armature and front contact relay 425 causes relays 426 and 427 in the display relay circuit to operate.

It will be recalled that when registrant No. 234 dialed his number from section No. 56, relays 302 and 304 and hold magnet 305 of his individual register circuit C were operated and locked in their operated conditions. As previously described, relays 302 and 304 store the information that registrant No. 234 last dialed from a section whose tens digit is "5" whereas the operation of hold magnet 305, following the operation of select magnet 224 imparts to the registry circuit C the further information that the registrant has last dialed from a section whose units digit is "6". The hold magnet 305 effects one of its cross-connections at the contact 308, thereby interconnecting conductors 428 and 429, the former of which is now grounded at the middle armature and front contact of relay 425 by way of the third armature and front contact of relay 408, brush 417 and bank terminal 419 of connector LC and conductor 462. The previous operation of relays 302 and 304 extends the ground now connected to lead 430 by the innermost armature and front contact of relay 425, over the upper armature and front contact of relay 302, second armature and back contact of relay 303, second armature and front contact of relay 304, to conductor 431. The now grounded conductors 429 and 431, through the operation of relays 426 and 427 in the display relay circuit, are extended to the filaments of lamps U6 and T5 which are located on the private branch exchange switchboard, and thence to grounded battery. Thus lamps U6 and T5 are lighted as a result of the attendant's dialing of the registrant's number "234". The U6 lamp is one of ten U lamps arranged in a horizontal row on the switchboard while the lamp T5 is one of six, or more, T lamps arranged in a horizontal row immediately below the U lamps. The U lamps represent the units digits 0 to 9 while the T lamps represent the tens digits 1 to 6, inclusive. Thus an attendant upon noting the lighted lamps U6 and T5 translates these indications into the two-digit number "56". The attendant is thus advised that registrant No. 234 has last registered in section No. 56 and may be reached there if necessary.

After noting the lighting of the section display lamps T5 and U6 indicating the location of registrant No. 234 the attendant withdraws the plug from jack 400 to release the locating selector LS and the locating connector LC. Withdrawal of the plug from jack 400 results in the release of relay 406 which in turn, releases relay 407. Relay 425 now releases removing ground from the connector brushes 416 and 417, and at its third lower armature opens the circuit to relays 426 and 427. Thus the section display lamps T5 and U6 are extinguished.

Release magnet 409 now operates in a circuit extending from grounded battery, winding of release magnet 409, contacts 433 of vertical off-normal springs VON, back contact and outermost armature of relay 407, back contact and armature of relay 406, to ground. The operation of the release magnet 409 allows the connector switch shaft to return to normal. When the switch is returned to normal the release magnet circuit is opened at contacts 433 etc., of vertical off-normal springs VON and the equipment is restored to its normal condition.

*Attendant paging*

After having ascertained the whereabouts of a particular registrant, such as registrant No. 234, an attendant at the private branch exchange may, if necessary, orally page such registrant in the section in which he has been located. This is accomplished through the medium of a paging connector PC (Fig. 4) which, through its multiple bank terminals may be selectively associated with any of sixty paging channels, each of which terminates in one or more loudspeakers conveniently located in each of the sixty sections into which the building is divided.

The paging connector PC terminates at the exchange switchboard in a jack 434 into which the attendant inserts a plug of her telephone cord and dials the number of the section in which she wishes to page. In the present case it will be assumed that the desired registrant has been located in section No. 56, in the manner previously described.

Upon seizure of the paging connector PC at the switchboard, relay 435 operates in the usual manner and completes an obvious operating circuit for slow-to-release relay 438. At its back contact and upper armature relay 438 opens the circuit to release magnet 436, and at its front contact and upper armature it prepares an operating circuit for the vertical magnet 437. At its front contact and lower armature relay 438 prepares an operating circuit for cut-through relay 439.

At each interruption of the attendant's dial in the dialing of the digit "5", relay 435 releases and operates the vertical magnet 437 in series with relay 440 in a circuit which includes contacts 441 of the vertical off-normal springs VON, the front contact and upper armature of relay 438, back contact and armature of relay 435 and ground. Relay 440 operates on the first impulse from relay 435. The vertical magnet 437 steps the shaft and brushes of the paging connector PC up to the fifth level in response to the dialing of the digit "5". Relays 438 and 440 are slow releasing and do not release on dial interruptions. On the first step of the shaft the vertical off-normal springs VON transfer the pulse circuit from spring contact 441 to the spring contact 442, but relay 440 being operated retains the pulse circuit through the vertical magnet 437 during the dialing of the first digit. When the impulses from relay 435 cease, relay 440 releases and transfers the pulse circuit from the vertical magnet 437 to the rotary magnet 444. On the next series of six impulses from the attendant's dial, relay 435 on releasing, operates the rotary magnet 444 in series with relay 445, relay 445 operating on the first impulse from relay 435. Relay 445 is slow releasing and does not release on dial interruptions. The rotary magnet 444 steps the connector shaft and brushes around to the sixth set of bank terminals which identify the paging channel PL of section No. 56 in the paging connector.

If the paging channel PL extending to section No. 56 should be busy, ground potential would be connected to the switch terminal 447 from the section finder SF (Fig. 5) over conductor 463 so that when the connector brush 448 comes into contact with this terminal and before relay 445 releases, relay 449 would operate in an obvious circuit which includes the first armature and back contact of relay 439 and the upper armature and front contact of relay 445. Relay 449, operated, opens the circuit to cut through relay 439 and, at its outer lower armature and front contact connects busy-tone from the source 450 to the ring side of the connection extending to the attendant's cord. Upon the release of relay 445 relay 449 locks up under control of relay 438. The circuit remains in this condition until the attendant, upon noting the busy signal in her receiver, withdraws her cord plug from jack 434. This operation releases relay 435 which in turn releases relay 438. Relay 438 opens the locking circuit for relay 449 which relay then releases. When relay 438 releases, a circuit for release magnet 436 is completed and the release magnet functions to allow the switch shaft to return to normal. When the shaft reaches its normal position the springs VON operate to open the circuit to release magnet 436 and to otherwise restore the circuit to normal.

If the paging channel is idle, relay 449 does not operate and upon the release of relay 445, cut-through relay 439 operates in a circuit extending from grounded battery, winding of relay 439, inner armature and back contact of relay 445, back contact and upper armature of relay 449, rotary off-normal spring contact 451, lower armature and front contact of relay 438, to ground. Relay 439 grounds the switch terminal 447 to mark the switch busy. Prior to dialing the section number "56," the attendant actuates the page key 452 which connects the attendant's telephone circuit ATC to the conductors 453 and 454 which, when relay 439 operated, as described, are extended to the selected paging section channel PL over corresponding brushes and terminals of the paging connector PC. The attendant's telephone circuit is equipped with a high quality microphone by means of which the attendant may transmit to the loudspeakers 127 and 128 via amplifier 129 (Fig. 1) in the selected section No. 56 any message required by the circumstances.

The paging connector is released when the attendant withdraws the plug of her cord from the jack 434 in the manner previously described.

*Emergency paging*

In the event of an emergency which requires the paging of all building sections simultaneously, the attendant at the switchboard actuates the emergency key 455 which connects her telephone circuit ATC including the high quality microphone (not shown) to the emergency paging circuit EP. The sets of bank terminals of the paging connector PC which identify the building sections in the connector are connected to normally open front contacts of a number of relays such as relays 457 and 458 the armatures of which are connected to the conductors 459 and 460 which terminate at springs of the emergency key 455. When this key is operated, relay 456 operates over an obvious circuit and causes the operation of the grouping relays such as relays 457 and 458. In this manner the attendant's telephone circuit is connected to all section paging channels and a message may be simultaneously transmitted over all such channels by means of the high quality microphone associated with the attendant's telephone circuit, to be broadcast from the loudspeakers in all sections of the building. Relay 456 at its outermost armature and back contact removes ground to release any identifier switch which may be off-normal at this time so as to permit emergency paging.

After transmitting the message to all sections simultaneously the attendant restores key 455 to normal, whereupon relays 456, 457 and 458 are released and the emergency paging circuit is restored to normal condition.

*Automatic paging of registrant with roving assignment and having a telephone*

Figure 7:
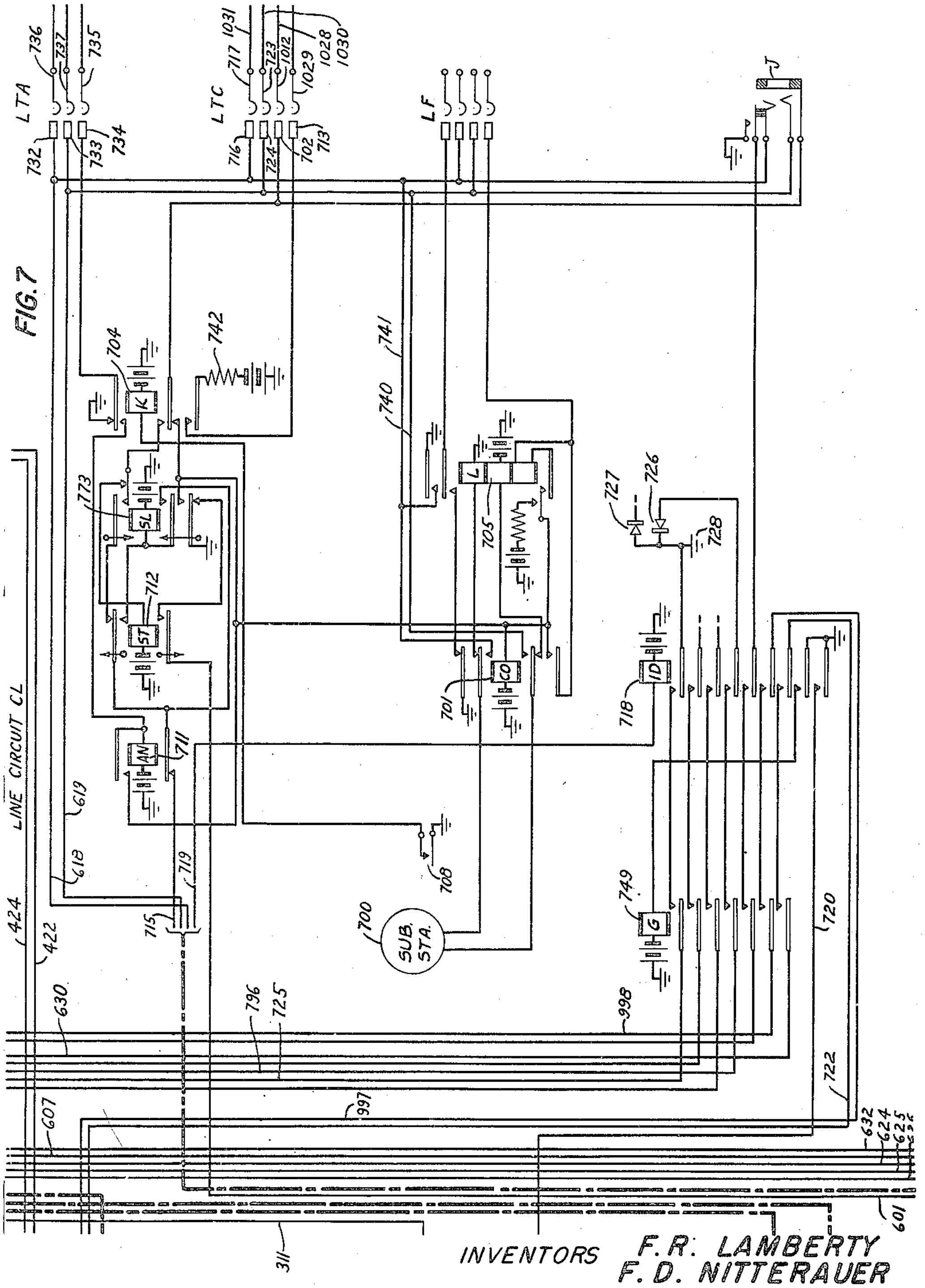
Fig. 7 illustrates a registrant's line circuit terminating multiply in the bank terminals of an answering connector switch (Fig. 11), of a calling connector switch (Fig. 10), a line finder LF and a jack J.

The line circuit LC shown in Fig. 7 represents the line circuit of a registrant, such as registrant No. 234 who has a roving assignment and who is also provided with a telephone. Such a registrant would ordinarily be located at one place in the building but would be called upon, at times, to visit other sections of the building. At 700 there is schematically illustrated a substation which identifies the usual location of the registrant. This substation includes a telephone set of the usual type and an auxiliary key 708 which key, when the registrant is at the substation, is left in its normal unoperated position. When the registrant leaves his station to visit other sections of the building, he actuates the key 708 which causes relay 704 to operate so as to cause any calls incoming to the particular registrant to be diverted in such a manner that instead of the telephone ringer at substation 700 being operated as a call signal, the registrant will be paged audibly and visually in the section in which he last registered after having left his station 700.

Figure 10:
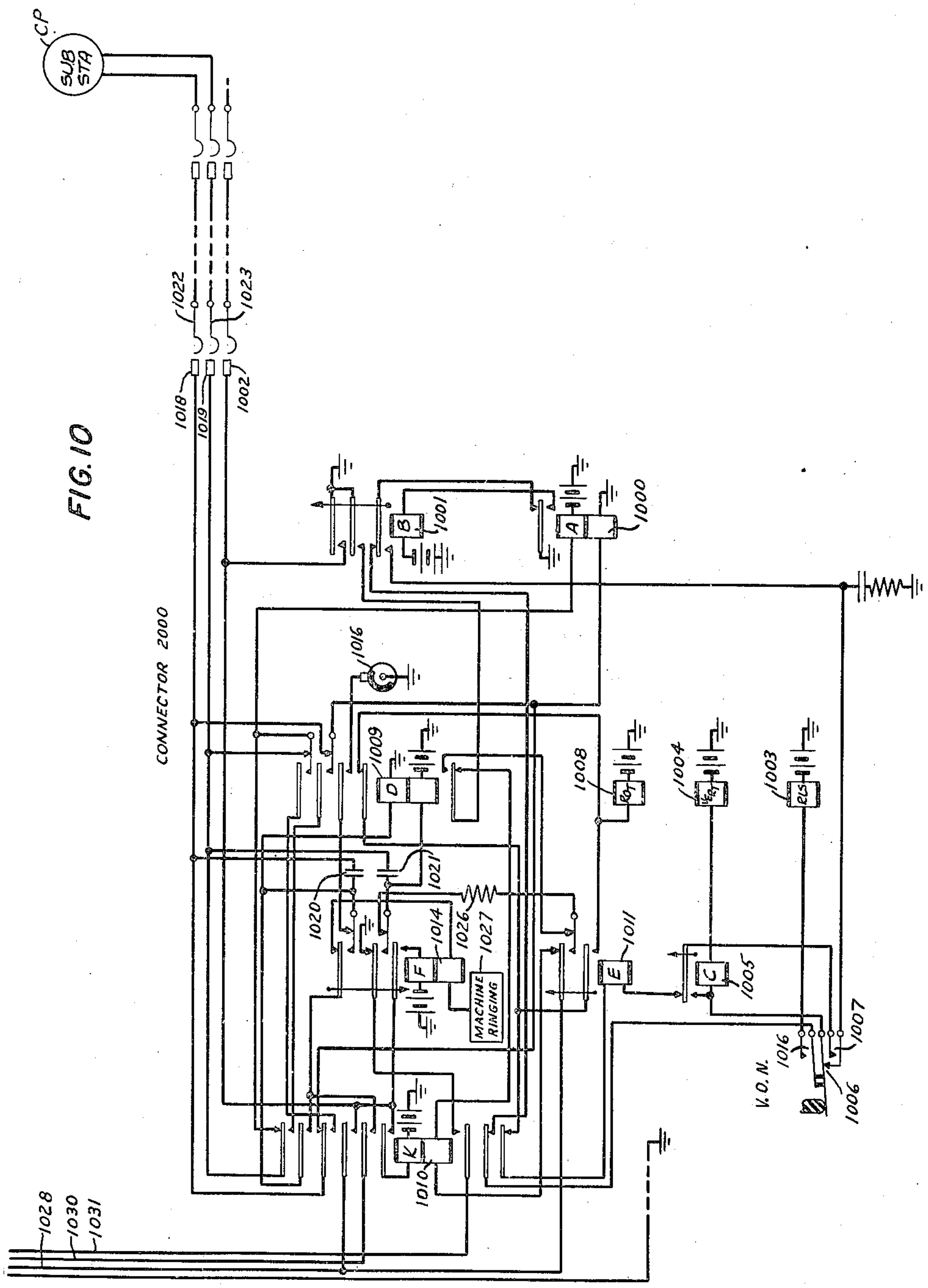
Fig. 10 is a diagrammatic representation of a connector circuit which is employed in extending a calling line to the line circuit of a called registrant.

The immediate description is concerned with a call originated at station CP (Fig. 10) for registrant No. 234 who is assumed to be located at substation 700. Under this condition, the key 708 is in its unoperated position, as illustrated, and relay 704 is deenergized.

The calling party at station CP (Fig. 10) initiates the call to registrant No. 234 in the usual manner after having ascertained that the registrant's call number is 2—234. The dialing of the first two digits of the call number extends the calling station to the bank terminals of an idle connector 2000 in the usual manner over the automatic switches schematically shown in Fig. 10. When the 2000 connector is seized by the last selector, relay 1000 operates over the calling station loop in a circuit which may be traced from grounded battery, upper winding of relay 1000, upper normal make-before-break contacts of relay 1009, selector bank terminal 1019 and corresponding brush 1023, thence over the closed station loop at station CP by way of the established connection, thence over the brush 1022 and corresponding selector terminal 1018, lower normal make-before-break contacts of relay 1009, to ground through the lower winding of relay 1000.

Relay 1000, operated, establishes an obvious operating circuit for slow releasing relay 1001. Relay 1001 operates in this circuit and at its third armature and front contact connects ground to the selector sleeve terminal 1002 thus holding the preceding switches in their operated positions in the well-known manner. At its first armature and back contact relay 1001 opens the circuit to release magnet 1003 and at the corresponding front contact prepares a circuit for vertical magnet 1004.

At each interruption of the dial at the calling station CP during the dialing of the third digit "3" of the call number "2—234," relay 1000 releases and operates the vertical magnet 1004 in series with relay 1005, relay 1005 operating on the first impulse from relay 1000. The pulsing circuit may be traced from grounded battery, winding of vertical magnet 1004, winding of relay 1005, contacts 1006 of vertical off-normal springs VON, front contact and first armature of relay 1001, back contact and armature of relay 1000 to ground.

The vertical magnet 1004 steps the shaft of the 2000 connector and its brushes to the desired third level in response to the dialing of the digit "3" at station CP. Relays 1001 and 1005 are designed to be slow in releasing and do not release on dial interruptions. On the first step of the switch shaft the off-normal springs VON operate and transfer the pulse circuit from contacts 1006 to contact 1007, but relay 1005 being operated retains the pulse circuit through the vertical magnet 1004 during the dialing of the digit "3."

When the impulses from relay 1000 cease, relay 1005 releases and transfers the pulse circuit from the vertical magnet 1004 to the rotary magnet 1008. On the next series of four impulses from the dial at station CP relay 1000, on releasing, operates the rotary magnet 1008 in series with relay 1011, relay 1011 operating on the first impulse from relay 1000. Relay 1011 is slow releasing and does not release on dial interruptions. The pulse circuit may be traced from grounded battery, winding of rotary magnet 1008, first upper armature and back contact of relay 1009, back contact and third lower armature of relay 1010, winding of relay 1011, back contact and armature of relay 1005, contacts 1007 of springs VON, front contact and first armature of relay 1001, back contact and armature of relay 1000 to ground.

The rotary magnet 1008 steps the connector shaft and brushes around to the terminals LTC (Fig. 7) of the called line CL. Relay 1011 operated, prepares the busy test circuit and short-circuits the upper normal back contacts of relay 1009 through which the rotary magnet circuit is taken so that operation of relay 1009, while the sleeve brush 1012 passes over busy terminals, will not open the rotary magnet circuit.

On completion of the dial interruptions of the last digit "4" of the call number "2—234" relay 1011, being slow in releasing remains operated a short interval of time after the connector brushes make contact with the terminals LTC of the called line CL, during which a busy test is made. If the called line is busy ground potential will be connected to the sleeve terminal 702 at the front contact and outer lower armature of relay 773 in the line circuit. This ground operates relay 1009 in a circuit extending from grounded battery, lower winding of relay 1009, lower normal make-before-break contacts of relay 1014, resistance 1026, alternate make-before-break contacts of relay 1011, conductor 1028, connector brush 1012 and terminal 702, to ground. Relay 1009, operated, opens the circuit through relay 1011 and rotary magnet 1008. Busy tone from the source 1016 is now supplied to the calling station CP over the front contact and second upper armature of relay 1009, upper normal make-before-break contacts of relay 1014, condenser 1020, selector terminal 1018 and brush 1022 and the tip conductor of the calling line. The circuit remains in this condition until the receiver at the calling station CP is replaced on the switchhook.

Assuming the called line CL to be idle, battery will be found on the terminal 702 by way of the winding of cut-off relay 701 and the back contact and inner lower armature of relay 704. Thus relay 1009 is prevented from operating. On the release of relay 1011, relay 1010 operates in a circuit extending from grounded battery, winding of cut-off relay 701, back contact and inner lower armature of relay 704, connector terminal 702 and brush 1012, conductor 1028, upper armature and back contact of relay 1011, lower winding of relay 1010, back contact and lower armature of relay 1009, front contact and middle armature of relay 1001, to ground. Relay 1010 operates sufficiently to close its innermost upper front contacts. When these contacts close the upper winding of relay 1010 is energized to ground at the third armature and front contact of relay 1001 and the relay 1010 fully operates.

Relay 1010, operated, connects direct ground from the third armature and front contact of relay 1001, over its front contact and third upper armature to the sleeve conductor 1028 to cause the operation of cut-off relay 701 in the line circuit CL. This same ground also places a busy condition on the sleeve terminals in the multiple bank. Relay 1010, operated, also opens the circuit to rotary magnet 1008 to prevent further stepping of the brushes should the calling party again operate the dial.

The connector brushes 717, 723, 1012 and 1029 are now standing on the terminals 716, 724 ,702 and 713, respectively, and cut-off relay 701 in the line circuit CL is operated as are also relays 1000, 1001 and 1010 in the connector circuit.

When cut-off relay 701 operates it extends the substation 700 to the connector terminals 716 and 724 by way of the conductors 740 and 741, respectively. When relay 1010 in the connector operates, it connects ringing current from the machine ringing source 1027 to the called line. The ringing circuit may be traced from the machine ringing current source 1027, lower winding of relay 1014, back contact and third armature of relay 1014, front contact and second upper armature of relay 1010, conductor 1030, connector brush 723 and terminal 724, conductor 740, front contact and first lower armature of relay 701, through the ringer coils (not shown) at substation 700, first upper armature and front contact of relay 701, conductor 741, connector terminal 716 and brush 717, conductor 1031, first lower armature and front contact of relay 1010, middle armature and back contact of relay 1014 to machine ringing ground. Part of the ringing current is projected out over the calling line by way of condensers 1020 and 1021 and gives the calling station an audible ringing tone as an indication that the bell at substation 700 is being rung. Relay 1014 is designed so as to not operate on ringing current.

When the receiver is removed from the switchhook at substation 700 in answer to the incoming call the direct current which is superimposed on the ringing current operates relay 1014 sufficiently to allow it to close its innermost upper front contacts. On the closing of these contacts the upper winding of relay 1014 is energized in a circuit which finds ground at the front contact and third armature of relay 1001. Relay 1014, operated, cuts off the ringing current, opens the audible ringing circuit and closes the talking circuit.

When the talking circuit is closed, relay 1009 operates in a circuit which is traced from grounded battery, lower winding of relay 1009, front contact and middle armature of relay 1014, front contact and first lower armature of relay 1010, conductor 1031, connector brush 717 and terminal 716, conductor 741, front contact and first upper armature of relay 701, through the closed loop at substation 700, first lower armature and front contact of relay 701, conductor 740, connector terminal 724 and brush 723, conductor 1030, second upper armature and front contact of relay 1010, third armature and front contact of relay 1014, upper winding of relay 1009 to ground. Talking battery is now supplied to the called substation 700 through the windings of relay 1009 and to the calling party at substation CP through the windings of relay 1000, by way of the third and fourth upper armatures and front contacts of relay 1009 and the third and fifth upper armatures and front contacts of relay 1010.

The calling party at station CP and registrant No. 234 at substation 700 are now in telephonic connection and may carry on conversation. At the termination of conversation the receiver at the calling station CP is replaced on the switchhook causing relay 1000 to release and in turn to release relay 1001. Relay 1001, released, opens the locking circuit to relay 1010 causing this relay to release. On the release of relays 1000, 1001 and 1010, the release magnet 1003 is energized in a circuit extending from grounded battery, winding of release magnet 1003, contacts 1016 of springs VON, second lower armature and back contact of relay 1010, back contact and first armature of relay 1001, back contact and armature of relay 1000 to ground.

The operation of release magnet 1003 allows the switch shaft of the 2000 connector to return to normal. When the switch is returned to normal position the release magnet circuit is opened at contacts 1016 of springs VON. When relay 1001 released, it removed ground from the selector terminal 1002 to allow the preceding switches to restore to normal in the well-known manner. With the restoration of the receiver at substation 700 to its switchhook the circuit is in its normal condition.

In the preceding description, registrant No. 234 was assumed to be present at his station 700 when the party at station CP originated a call intended for the registrant. It will now be assumed that the registrant has left station 700 to visit other sections of the hospital. As he enters such other sections he dials his number "234" at the dial stations provided for this purpose, in accordance with regulations. In order to simplify the description it will be assumed that the registrant has last registered in section No. 56 and that information to this effect is stored in the register circuit C in the manner previously described.

When registrant No. 234 leaves substation 700 he actuates key 708 which causes relay 704 to operate in an obvious circuit. At its upper armature and front contact relay 704 connects the winding of relay 711 to the sleeve terminal 734 of the 3000 connector for a purpose to be described hereinafter. At its inner lower armature and front contact relay 704 connects the winding of "start" relay 712 to the terminal 702 of the 2000 connector. At its outer lower armature and front contact relay 704 connects grounded battery to the connector switch terminal 713 by way of resistance 742 for a purpose which will appear from a later description.

When the party at station CP dials the digits of the registrant's call number "2—234" the connector 2000 seizes the called line CL by way of the group of terminals LTC as previously described. Relay 1001 in the connector circuit operates to connect ground to the sleeve brush 1012 by way of the third upper armature and front contact of relay 1010 and conductor 1028. With the terminals LTC of the 2000 connector engaged by their corresponding brushes, the ground on brush 1012 is extended over bank terminal 702, inner lower armature and front contact of relay 704, normal make-before-break contacts of relay 773, to battery and ground by way of the winding of "start" relay 712. Relay 712 operates in this circuit.

Relay 712, operated, completes an operating circuit for relay 600 (Fig. 6) which may be traced from grounded battery, winding of relay 600, conductor 601, lower armature and front contact of "start" relay 712, to ground by way of the outer lower armature and back contact of relay 773. Relay 600 is one of a number of such relays which are associated with the identifier switch ID (Fig. 6) which switch serves two hundred lines including the line CL. Each relay such as 600 serves a group of twenty lines. The identifier switch ID serves the group of lines which are numbered 100 to 299 and, therefore, serves the line CL which is assigned the number "234" corresponding to the registry number of registrant No. 234 to whom the line CL is assigned. Relay 600, illustrated, serves that group of twenty lines appearing in the seventh level of the switch so that when relay 600 operates it functions by means of its upper armature and front contact, to mark the level in which the called line appears in the identifier bank terminals.

Relay 712, operated, connects battery through the winding of relay 773 to the sleeve terminal 602 of the identifier switch by way of conductor 715 and the lower armature and back contact of relay 711 thereby marking the identifier terminal of the called line. When relay 600 operated it applied ground to commutator segment 604 which identifies the level in which the called line CL is located. As previously stated, the identifier switch ID serves a two hundred line group, lines 100 to 299 inclusive, and the first hundred lines are connected to the first five levels while the second hundred lines are connected to the second five levels. Thus, in response to the operation of relays 600 and 712 and the consequent marking of the identifier commutator and switch terminals 604 and 602, respectively, the called line is effectively marked in the identifier.

At its inner armature and front contact relay 600 completes an obvious operating circuit for relay 605. Relay 605, at its outermost armature and back contact opens the circuit to release magnet 606; at its middle armature and front contact it connects ground to conductor 607 for a purpose which will appear presently; and at its innermost armature and front contact it completes a circuit for stepping relay 608 which extends from grounded battery, second armature and back contact of relay 609, lower winding of relay 608, outer armature and back contact of rotary magnet 610, back contact and armature of vertical magnet 611, front contact and innermost armature of relay 605, to ground.

Relay 608, operated, causes the vertical magnet 611 to operate from grounded battery, over the second armature and back contact of relay 609, winding of vertical magnet 611, back contact and second armature of relay 612, front contact and armature of relay 608, to ground over the front contact and innermost armature of relay 605. The vertical magnet 611 and stepping relay 608 step the identifier switch shaft vertically until the commutator brush 613 reaches segment 604 which is grounded by relay 600. When this segment is reached, relay 612 operates in series with the lower winding of relay 608. This holds relay 608 in the operated position to prevent further stepping.

Relay 612, operated, at its outermost armature transfers the locking circuit for relay 615 from the off-normal grounded contact 614 of springs VON to a circuit which is grounded for each operation of the rotary magnet 610. The circuit to release magnet 606 is opened at the innermost armature of relay 612, which relay, at its second armature transfers the stepping circuit to the winding of rotary magnet 610. The rotary magnet then steps the switch shaft around until the brush 616 thereof engages the marked sleeve terminal 602 of the called line CL. When this occurs, relay 773, in the line circuit CL, operates in a circuit which may be traced from grounded battery, winding of relay 773, front contact and upper armature of relay 712, lower armature and back contact of relay 711, conductor 715, terminal 602, brush 616, lower winding of relay 617, back contact and uppermost armature of relay 609, upper winding of relay 608, to ground at the front contact and middle armature of relay 605. Relay 773 opens the operating circuit of start relay 712 which relay releases. Relay 617 operates in the circuit just traced sufficiently to close its innermost contacts and relay 608 is held operated to prevent further stepping. On the closure of the innermost armature contacts of relay 617 the secondary winding of the relay is energized. The relay then fully operates and locks to the sleeve lead as will be described. Relay 617 locks initially by way of its front contact and first armature, inner armature and front contact of rotary magnet 610, front contact and armature of relay 608, to ground over the front contact and first armature of relay 605. When relay 609 operates as will be described presently, relay 617 locks over conductor 607 to ground at the back contact and outermost armature of relay 456.

At its fourth and fifth armatures and front contacts relay 617 extends the tip and ring conductors 618 and 619 from their corresponding brushes 627 and 636 through to the page control circuit (Fig. 9) by way of conductors 624 and 625. At its sixth or outermost armature and front contact relay 617 connects the brush 622 to the sixth left armature of relay 900, in the page control circuit, by way of conductor 626. At its second armature and back contact relay 617 opens the circuit to relay 615. At its third armature relay 617 opens the release circuit and completes an operating circuit to relay 609. This circuit may be traced from grounded battery, winding of relay 609, third armature and front contact of relay 617 to ground at contacts 614 of the vertical off-normal springs VON.

The start relay 901 in the page control circuit now operates in the following circuit: from grounded battery, winding of relay 901, back contact and fourth lower armature of relay 902, conductors 993 and 624, fourth armature and front contact of relay 617, second upper armature and back contact of relay 615, identifier switch brush 627 and terminal 621, conductor 618, terminal 716 and brush 717 of the 2000 connector, conductor 1031, first lower armature and front contact of relay 1010, second armature and back contact of relay 1014, to machine ringing ground.

At its outer upper armature and front contact relay 901 completes an operating circuit for busy test relay 903 to ground at the fifth upper armature and back contact of relay 902. At its third lower armature and front contact relay 901 causes chain relay 904 to operate in a circuit from grounded battery, over resistance 905, third lower armature and front contact of relay 901, winding of relay 904, to ground by way of the normal make-before-break contacts of all the higher numbered relays in the relay chain circuit including those of the last chain relay 906. Relay 904, operated, completes an operating circuit for relay 900 to ground over the upper armatures and back contacts of all lower numbered relays in the chain circuit.

At its outermost left armature and front contact relay 900 causes the line identification relay 718 in the called line circuit CL to operate in a circuit which may be traced from grounded battery, winding of relay 718, conductor 719, terminal 628 and brush 622 of the identifier switch ID (Fig. 6), back contact and first lower armature of relay 615, front contact and outermost armature of relay 617, conductor 626, to ground at the outermost left armature and front contact of relay 900.

Figure 5:
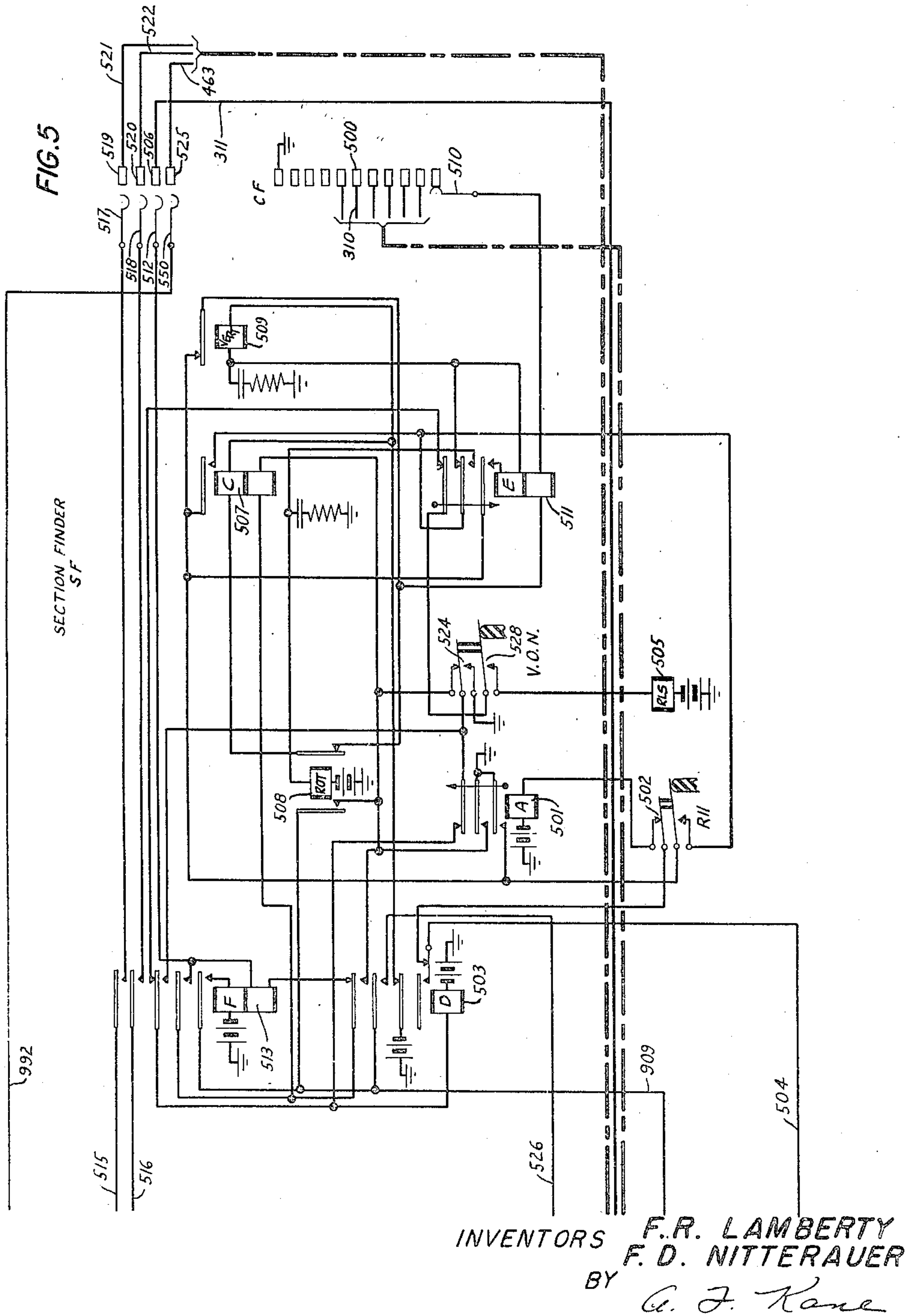
Fig. 5 is a section finder SF which functions to locate the various sections in which a registrant may have last registered, and to selectively connect the audible paging equipment of Fig. 8 to such sections.

At its eighth armature and front contact relay 718 completes an obvious operating circuit for relay 749. At its ninth armature and front contact relay 718 marks the level on the section finder SF (Fig. 5) of the section in which the called registrant No. 234 last registered, which section has been assumed to be section No. 56. The marking of the level of the section finder SF is effected over the following circuit, it being remembered that when the registrant No. 234 registered from section No. 56, relays 302 and 304 and hold magnet 305, all associated with his individual register circuit C were operated and locked: from ground at the ninth armature and front contact of identification relay 718, conductor 720, upper armature and front contact of relay 302, middle armature and back contact of relay 303, second armature and front contact of relay 304, conductors 431 and 310 and segment 500 of the commutator CF of the section finder SF (Fig. 5). Segment 500 identifies the level in which the section No. 56 appears in the section finder bank.

The particular terminal appearance of the section No. 56 in the section finder SF is marked in the following manner incident to the operation of relay 900: from grounded battery through the upper winding of relay 902 in the page control circuit (Fig. 9), innermost left armature and front contact of relay 900, conductor 630, seventh armature and front contact of relay 749, front contact and seventh armature of relay 718, conductor 722, cross-connection point 309 of the cross bar switch CB, conductor 311, to the sleeve terminal 506 of the section finder switch SF. Thus the grounding of commutator segment 500, as previously described, and the connection of battery through the upper winding of page control relay 902 to the terminal 506 of the section finder SF mark the section No. 56 in the section finder.

Also incident to the operation of relay 900 in the page control circuit (Fig. 9), relay 501 in the section finder SF (Fig. 5) is operated in a circuit extending from grounded battery, winding of relay 501, contacts 502 of the switch springs R11, normal make-before-break contacts of relay 503, conductor 504, to ground at the third right armature and front contact of relay 900. Relay 507 now operates in a circuit traced from grounded battery, second armature and back contact of relay 503, upper winding of relay 507, right armature and back contact of rotary magnet 508, back contact and armature of vertical magnet 509, to ground at the front contact and innermost armature of relay 501. Relay 507, operated, operates the vertical magnet 509 which steps the shaft of the section finder SF up until the commutator brush 510 reaches segment 500 which is grounded by the operation of relay 718 of the line circuit C (Fig. 7) corresponding to the called line of registrant No. 234, as previously described. When this segment is reached, relay 511 operates in series with the upper winding of stepping relay 507 in a circuit which may be traced from grounded battery, second armature and back contact of relay 503, upper winding of relay 507, right armature and back contact of rotary magnet 508, lower winding of relay 511, commutator brush 510 and the grounded commutator segment 500. This holds relay 507 in the operated position to prevent further stepping. Relay 511 is made slow in operating to allow a short time to elapse between the last vertical step and the first rotary step of the switch shaft. At its outermost armature and back contact relay 511 opens the release circuit to release magnet 505 to preclude the release, or partial release of the shaft and the reoperation of relay 501 before the release of relay 511. At its middle armature relay 511 transfers the stepping circuit from the vertical magnet 509 to the rotary magnet 508.

The rotary magnet then operates and steps the shaft of section finder SF around until the brush 512 thereof engages the terminal 506 to which battery has been connected, as previously described. During the rotary stepping of the switch the locking circuit to relay 513 is opened on the release of the rotary magnet 508 for the purpose of preventing a false operation of this relay when the switch brushes are stepped over a busy or grounded sleeve terminal, such as 506, in which case a circuit is closed from ground at the bank terminal, through the lower winding of relay 513, back contact and outermost armature of relay 503, lower winding of relay 507, to ground at the front contact and middle armature of relay 501. This tends to operate the lowermost armature of relay 513 on the opening of the circuit of the upper winding of relay 507.

When brush 512 engages the terminal 506, battery on this terminal is extended over brush 512, through the lower winding of relay 513, back contact and outermost armature of relay 503, lower winding of stepping relay 507, to ground at the middle armature and front contact of relay 501. When relay 513 is energized in this circuit it closes its innermost armature contacts and prepares a locking circuit for itself which is completed when relay 503 operates as will be described presently.

At its fourth and fifth armatures and front contacts relay 513 extends the leads 515 and 516 from the page control circuit to the section finder brushes 517 and 518, respectively, which now rest upon the corresponding bank terminals 519 and 520. The conductors 515 and 516 constitute a speech channel which extends from the call announcing device shown schematically at 800 in Fig. 8. The section finder terminals 519 and 520 are connected to the conductors 521 and 522 which are connected to the paging channel or trunk PL (Fig. 3) individual to section No. 56 in which section the paging channel terminates in the loudspeakers 127 and 128 which are connected to the output terminals of the section amplifier 129. Thus the output of the call announcing device 800 is connected through to the paging channel or trunk PL of section No. 56.

When relay 513 of the section finder SF operates, a circuit is completed from grounded battery, through the winding of relay 503, over the third armature and front contact of relay 513, to ground at contacts 524 of the vertical off-normal springs VON of the section finder. Relay 503 operates in this circuit and at its innermost armature disconnects the conductor 504 from the contact 502 of the springs R11, thus opening the operating circuit for relay 501 which, being slow releasing, holds operated for a short interval. At its third armature and front contact relay 503 extends the locking circuit for relay 513 to conductor 526 which, prior to the operation of relay 902, finds ground at the front contact and middle lower armature of relay 901. At its outermost armature and back contact relay 503 opens the circuit to the brush 512, and at its second armature and back contact, removes battery from relays 507 and 511 and from the vertical magnet 509. At its outermost armature and front contact relay 503 short-circuits the lower winding of relay 507 causing this relay to release. Relay 511 thereupon releases.

Relay 902 (Fig. 9) now operates in a circuit extending from grounded battery, upper winding of relay 902, innermost left armature and front contact of relay 900, conductor 630, seventh armatures and front contacts of relays 749 and 718, conductor 722, cross-connection point 309 of cross bar switch CB, conductor 311, section finder terminal 506 and brush 517, front contact and second upper armature of relay 513, outermost armature and front contact of relay 503, to ground by way of the front contact and middle armature of relay 501, before the release of this relay. At its fourth lower armature and back contact relay 902 opens the operating circuit to relay 901 which relay, after a short interval, releases. At its second lower armature relay 902 connects ground to conductor 526 to replace the ground from the innermost lower armature and front contact of relay 901, this ground serving to hold relay 513 in the section finder locked operated.

Relay 902, operated, locks in a circuit which is traced from grounded battery, lower winding and innermost front contact and armature of relay 902, outer armature and back contact of relay 906, conductor 607, to ground at the front contact and middle armature of relay 605 in the identifier ID.

With relay 902 operated, off-normal relay 910 operates in a circuit extending from grounded battery, winding of relay 910, conductor 909, third armature and front contact of relay 503, conductor 526, to ground at the second lower armature and front contact of relay 902. Relay 910, at its outer left armature and front contact connects the impedance coil 912 across the connection extending to the 2000 connector to simulate the removal of the receiver at a called telephone station. When this occurs, relay 1014 in the 2000 connector operates in the following circuit: from direct current in the machine ringing supply, lower winding of relay 1014, back contact and outermost armature of relay 1014, front contact and second upper armature of relay 1010, conductor 1030, connector brush 723 and corresponding terminal 724, conductor 619, identifier switch terminal 620 and corresponding brush 636, back contact and outermost upper armature of relay 615, front contact and fifth armature of relay 617, conductor 625, outer left armature and front contact of relay 910, impedance coil 912, back contact and armature of relay 913, conductor 624, fourth armature and front contact of relay 617, middle upper armature and back contact of relay 615, brush 627 and terminal 621 of identifier switch ID, conductor 618, terminal 716 and corresponding brush 717 of the 2000 connector, conductor 1031, innermost lower armature and front contact of relay 1010, to machine ringing ground at the middle armature and back contact of relay 1014.

Relay 1014 in the 2000 connector, operated, cuts off the ringing current to the called line, opens the audible ringing circuit to the calling station CP, and at its middle and outermost armatures and front contacts extends the tip and ring conductors from the connector brushes 717 and 723 to the selector terminals 1018 and 1019, respectively, and thence to the calling station CP.

When relay 902 operated, it opened the operating circuit for relay 901 which relay releases and in turn releases chain relay 904. Relay 900 then releases its armatures as does also relays 718 and 719.

The connection thus far described finds the conductors 515 and 516, which, as will appear presently, constitute a continuation of the call announcer output leads 802 and 803 when relay 917 is operated, extended to the paging channel PL of section No. 56. This extension involves the fourth and fifth armatures and front contacts of relay 513, brushes 517 and 518 and the corresponding terminals 519 and 520 of the section finder SF, conductors 521 and 522 which are connected to the paging channel PL in Fig. 3. The connection is thus prepared for the audible paging of registrant No. 234 in section No. 56.

*Audible paging*

Figure 8:
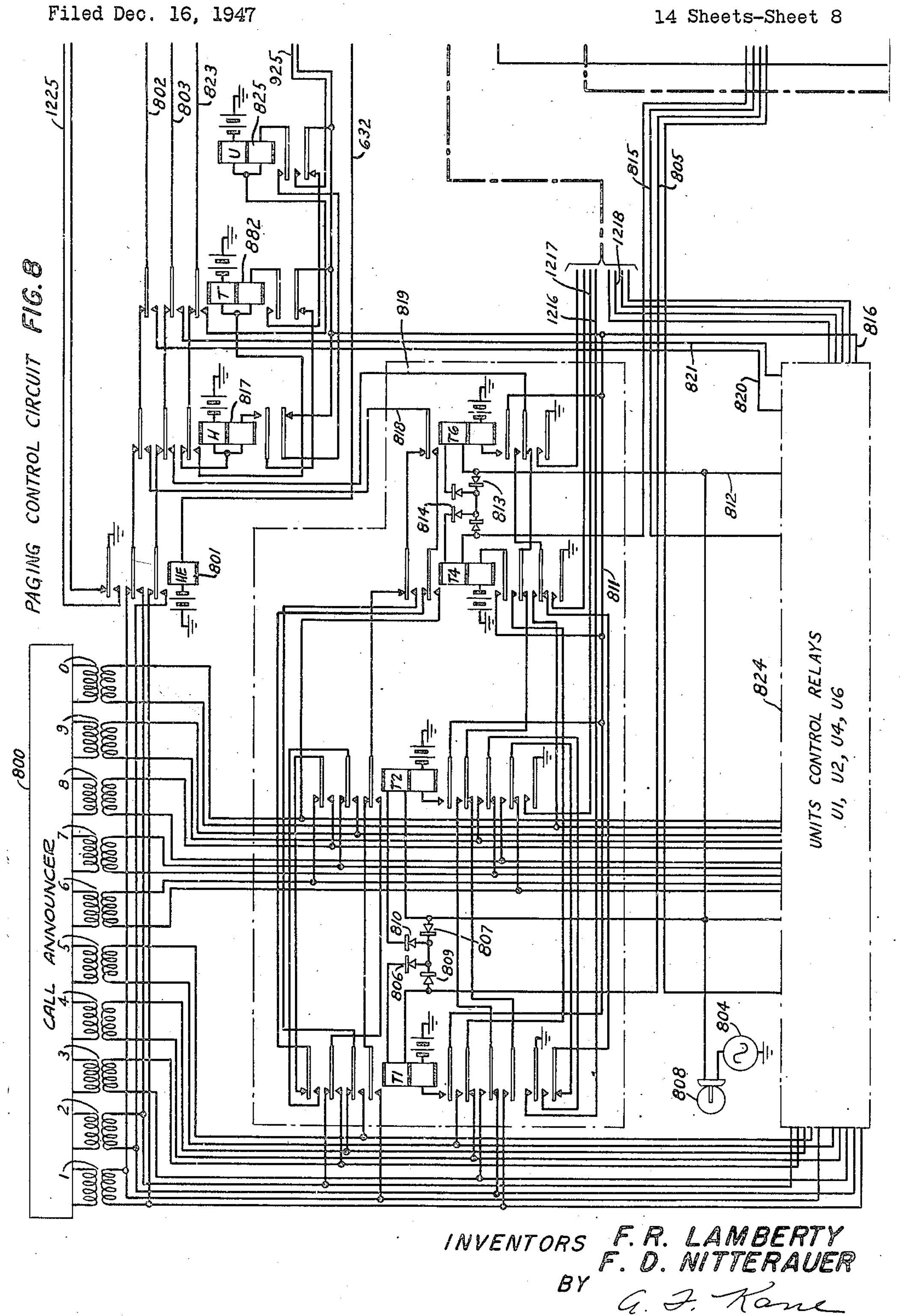
Figs. 8, 9 and 12 show the page control circuits which serve to control the audible and visual paging instrumentalities.

Any suitable call announcing device may be employed to provide for the audible paging of the registry numbers in the various sections of the hospital. The call announcer schematically shown at 800 in Fig. 8 is of any well-known type and may comprise ten continuously driven magnetic tapes each having associated therewith the usual sound pick-up device. In the schematic showing of the call announcer 800 each of the ten pick-up devices terminates in the primary winding of an output transformer. These transformers are designated 1 to 9 and zero, the designations being indicative of the digit recordings of the corresponding tapes. Each tape has recorded thereon, for audible reproduction, the name of one of the digits 1, 2, 3 . . . 0 at regularly spaced intervals. Interposed between each recording of a digit on each tape is a recording of a relatively high frequency tone signal so that as each tape is moved over its associated pick-up device there will be impressed on the primary winding of its corresponding transformer 1, 2 . . . 0 a group of signals consisting alternately of the high frequency tone signal and the speech frequency signal identifying a particular digit. Thus, the tone and digit signals follow one another in sequence. The tone signal, as will be described more fully hereinafter, is employed as a cut-in signal to control the connection of the call announcer tape outputs to conductors 515 and 516 which, as hereinbefore indicated, are now extended to the paging channel PL of section No. 56, thereby insuring the closure of the call announcer to the paging channel at the proper time relative to the digit recording on the tapes.

Upon the initiation of the call announcing or audible paging operation a speech detector 913 is first connected to the output transformer of the announcing tape through a high-pass filter 912 which will permit the detector to respond to the tone signal but not to the digit signal. At the end of the tone signal the transmission circuit to the section amplifier 129 (Fig. 1) is closed at armature contacts of relay 917 and the filter is by-passed. The digit signal is then transmitted to the loudspeakers 127 and 128 and also causes the detector to respond. At the end of the digit signal the transmission circuit is opened, the filter is again inserted and the circuit is transferred from the hundreds digit tape output to that of the tens digit tape. The described procedure is then repeated and the circuit is transferred to the units digit tape output. After the units digit has been transmitted the transmission circuit to the loudspeakers is opened while the above cycle of the hundreds, tens and units pronouncements is repeated to provide an interval of time between successive pagings. After three pagings the connection is released.

The manner in which the three successive pagings of the registry number "234" and the circuits involved will now be described in detail. In order that the correct number, corresponding to the called line CL (Fig. 7), be reproduced and transmitted to the section No. 56 it is necessary that the controls of the call announcer be operated in a manner which is distinctively characteristic of the line CL. To attain this end the line identification relay 718 (Fig. 7) is provided as are also the dry rectifiers 726 and 727, one terminal of each of which is grounded at 728.

When the identification relay 718 in the line circuit CL individual to the call registrant No. 234 operated, and during the period of operation of relays 900 and 718 a particularly characterized group of impulses was transmitted over conductors 725 and 726 to condition the call announcer control equipment (Fig. 8) so as to cause it to function to transmit the pronouncements of the tens and units digits "3" and "4" of the called number "234". The means employed to characterize these impulses consists of the two oppositely poled rectifiers 726 and 727 and ground 728. These elements are connected differently to two or more of the first, second, third and fourth armatures of the identification relay 718 for each line circuit, such as CL. In the case at hand, the first armature of relay 718 is connected directly to ground at 728 and the fourth armature to the negatively poled rectifier 726. Thus, certain of the control relays of the call announcer 800 will operate, as will be described presently, to identify the tens and units digits of the called registry number "234."

When the identifier switch ID, which has been assumed to serve the line circuits of two hundred registrants having code Nos. 100 to 299, inclusive, operates, its normal post springs 631 operate in the well-known manner. The first one hundred line circuits are disposed in the lower five levels of bank terminals of the switch and the second one hundred line circuits are located in the next five levels. The normal post springs 631 of the identifier switch are arranged to be operated only when the switch is stepped up to the sixth or higher level so that their operation will identify the hundreds digit of the called registrant as "2" since the sixth and higher levels of the switch serve the lines numbered 200 to 299, inclusive. When the normal post springs 631 are operated, ground potential is extended over conductor 632 to battery and ground through the winding of relay 801, causing this relay to operate. Had the calling line designation including the hundreds digit "1" the normal post springs would not operate and relay 801 would remain deenergized. At its first and second armatures and front contacts relay 801 connects the secondary of the output transformer 2, which is associated with the call announcer tape bearing the recording of the word "two", to conductors 802 and 803, which as will be described, will be extended to the paging channel PL of section No. 56.

With relays 718 and 749 of the line circuit of registrant No. 234 and relay 900 in the page control circuit operated, circuits are completed from the line identification elements 726 and 728 in which the tens relays T1 and T2 and also the units relay U4 (not shown) of the call announcer control circuits (Fig. 8) operate. The operating circuit for relay T1 extends from the grounded source of alternating current 804, through the filament of lamp 808, rectifiers 807 and 806, upper winding of relay T1, conductor 805, fourth left armature and front contact of relay 900, conductor 725, first armatures and front contacts of relays 749 and 718 to ground at 728. Relay T2 operates over a similar circuit on the negative half cycles from the source 804 except that rectifiers 809 and 810 and the upper winding of relay T2 are substituted for rectifiers 807 and 806 and the upper winding of relay T1, respectively. Thus relays T1 and T2 are operated to identify the tens digit "3" of the called registrant's number "234." These relays lock operated over their innermost lower armatures and front contacts to conductor 811 which finds ground at the front contact and second right armature of relay 910.

Similarly relay U4 (not shown) of the units control relays circuit 824 will operate in a circuit from the source 804, over conductor 812, through two rectifiers in the units control relay circuit corresponding to rectifiers 813 and 814 of the tens control relays circuit, the upper winding of a relay U4 corresponding to relay T4, conductor 815, the third left armature and front contact of relay 900, conductor 796, the fourth armatures and front contacts of relays 749 and 718, rectifier 726 to ground at 728. Thus a single relay U4 operates to identify the units digit "4" of the called registrant's registry number "234" and locks to ground at the second right armature and front contact of relay 910 over conductors 816 and 811. Relays T1 and T2 serve to connect the secondary winding of the output transformer 3 of call announcer 800 to conductors 818 and 819 which, as will be described hereinafter will be connected to conductors 802 and 803 upon operation of relay 817. Similarly, the units relay 44 serves to connect the output transformer 4 of call announcer 800 to conductors 820 and 821 which, as will be described presently, will be connected to conductors 802 and 803 when relay 822 is operated.

With relay 801 operated as described, the call announcer tape associated with output transformer 2 becomes effective and depending upon the position of the tape relative to its pick-up device at the time relay 801 operates, either a tone or a speech signal will be transmitted. If at this time the tape functions to project the speech signal over the transmission channel the speech detector 913 will not respond thereto since the high-pass filter 914 will block out the speech signal. Relay 915 therefore does not operate. As the tape continues to advance, the speech signal is discontinued and the tone signal is next transmitted over the transmission channel and relay 915 operates since the filter 914 passes this signal. The circuit in which relay 915 operates extends from the secondary of call announcer transformer 2, front contacts and first and second armatures of relay 801, back contacts and second and third upper armatures of relays 817 and 822, conductors 803 and 802, back contacts and second and first upper armatures of relay 916, third and fourth upper armatures and front contacts of relay 902, fifth and sixth armatures and back contacts of relay 917, high-pass filter 914, seventh and eighth armatures and back contacts of relay 917, detector 913 and the winding of relay 915.

Relay 915, operated, causes relay 918 to operate in a circuit extending from grounded battery, resistance 919, winding of relay 918, normal closed armature contacts thereof, front contact and armature of relay 915, to ground over the front contact and second right armature of relay 910. Relay 917 does not operate at this time since ground potential is connected to both terminals of its winding. Relay 918 locks to ground at the second right armature and front contact of relay 910.

As the announcing tape continues its travel the tone signal is discontinued and relay 915 releases its armature. This removes ground potential from the lower winding terminal of relay 917 and this relay now operates in a circuit extending from grounded battery, resistance 920, winding of relay 917, front contact and armature of relay 918, to ground at the front contact and second left armature of relay 910.

At its first armature and front contact relay 917 prepares a release circuit for relay 918. At its second and fourth armatures and front contacts relay 917 extends the transmission channel, consisting of conductors 802 and 803, from the call announcer to conductors 515 and 516 which are now connected to the paging channel PL of section No. 56. At its fifth, sixth, seventh and eighth armatures relay 917 causes the filter 914 to be by-passed and the speech detector 913 and relay 915 to be connected directly to the transmission channel 802—803 by way of armature contacts of relays 916 and 902. At its first armature and front contact relay 917 prepares an operating circuit for relay 817 which relay, at this time, closes only its innermost upper armature contacts and does not immediately close its remaining armature contacts.

As the tape advances, the digit "2," or speech signal is transmitted over the second and third upper armatures and back contacts of relays 817 and 822, over the transmission channel 802—803, and thence through the speech detector 913 and the winding of relay 915 by way of the circuit previously traced, it being understood that filter 914 is by-passed at this time. The speech signal is also transmitted, by way of the front contacts and the second and fourth armatures of relay 917, back contacts and upper armatures of relay 921, third and fourth upper armatures and back contacts of relay 903, conductors 516 and 515, fourth and fifth armatures and front contacts of relay 513, brushes 518 and 517 and corresponding terminals 520 and 519 of section finder SF and conductors 522 and 521 to the paging channel PL. The speech signal corresponding to the digit "2" is thus amplified at 129 and broadcast in section No. 56 over loudspeakers 127 and 128.

An interval after the closure of the innermost upper front contacts of relay 817, the lower front contacts of this relay close to connect the two relay windings in series between grounded battery and ground at the front contact and second left armature of relay 910, this path including the outer lower armature and back contact of relay 822. Relay 817 now receives sufficient current to cause its full operation.

When relay 915 responded to the speech signal just transmitted it connected ground potential over the third armature and front contact of relay 917 to the lower winding terminal of relay 918 thereby shunting this relay down. Relay 917, however, remains operated until the digit "2" or speech signal ceases at which time relay 915 releases and causes relay 917 to release.

With relay 817 operated and locked, the call announcer output transformer 3 is connected to the transmission channel 802—803 in place of the transformer 2. This connection is effected by way of the third upper and third lower armatures and front contacts of relay T1, the first upper and second lower armatures and front contacts of relay T2, the second upper and lower armatures and back contacts of relay T4, the first upper and second lower armatures and back contacts of relay T6, conductors 818 and 819, the front contacts and third and second upper armatures of relay 817 and the back contacts and third and second armatures of relay 822.

The call announcer tape, by way of its associated pick-up device and transformer 3 now causes the high frequency tone signal to be transmitted over the path just traced. With relays 917 and 918 in their released conditions, this signal traverses the high-pass filter 914, the speech detector 913 and the winding of relay 915. Relay 915 responds to this tone signal. The paging channel PL is, at this time, disconnected from the call announcer transmission channel 802—803 at the front contacts and the second and fourth armatures of relay 917.

Relay 915 operated again, starts the cycle in which relays 915, 917 and 918 cooperate to cause the transmission of the digit "3" or speech signal over the paging channel PL for amplification by amplifier 129 and reproduction and broadcasting by loudspeakers 127 and 128 in section No. 56. The manner in which this is effected is now apparent.

When relay 917 operated in this second cycle just after the discontinuance of the tone signal from transformer 3, relay 822 was partially energized by way of its upper winding, front contact and first upper armature of relay 817, back contact and first upper armature of relay 822, conductor 823, first armature and front contact of relay 917 to ground at the front contact and second right armature of relay 910. Relay 822 closes only its upper innermost front contact on this partial energization. An interval later the lower first armature closes its front contact to connect the two relay windings in series. Relay 822 then receives sufficient current to fully operate. When relay 822 fully operates, it transfers the transmission channel 802—803 from the tens control relays T1, T2, T4 and T6 to corresponding U relays in the units control relay circuit 824. These relays have not been illustrated since they are duplicates of the T relays illustrated in detail, are controlled in a similar manner and perform the same functions, except that the T relays register the tens digit of the called line designation whereas the U relays register the units digit.

When relay 822 fully operates it extends the conductors 820 and 821, which are connected to the units control relay circuit 824 in the same manner as are conductors 818 and 819 connected to the tens control relay circuit, to the transmission channel 802—803. Relays 915, 917 and 918 again repeat their cycle of operations to cause the speech signal output of transformer 4 to be transmitted over the paging channel PL in a manner now apparent. This results in the broadcasting of the pronouncement "four" over loudspeakers 127 and 128 in section No. 56. Thus, the words "two," "three," "four" have been broadcast in that order once in section No. 56.

After the pronouncement of the digit "4," or speech signal, has been transmitted as described, relay 825 fully operates, this relay being of the same design as relays 817 and 822. The manner in which this relay initially operates is similar to that described in connection with the initial operations of relays 817 and 822. When fully operated the locking circuit for relay 822 is opened and relay 822 releases, it being understood that when relay 822 operated it opened the locking circuit for relay 817. Relays 817 and 822 are now in their released condition. At its first lower armature relay 825 locks under control of relays 817 and 822. At its second armature and front contact relay 825 connects the ground potential on conductor 811 to conductor 925 which causes relay 921 to operate, the operating circuit including the normal closed contacts and winding of relay 921, resistance 924 and battery and ground.

With relays 817 and 822 released, tone from the call announcer tape corresponding to transformer 2 is again transmitted over the announcing channel 802—803, through filter 914, speech detector 913 and the winding of relay 915. Relay 915 operates causing relay 918 to operate and lock to ground at the second left armature and front contact of relay 910. When the tone signal ceases, relay 915 releases thereby removing the shunt from relay 917 causing this relay to operate to again cause relay 817 to partially operate. When the speech signal corresponding to the digit "2" is again transmitted from the call announcer, it will not be broadcast over the loudspeakers 127 and 128 of section No. 56 by way of paging channel PL because the path from the call announcer to the paging channel PL is now open at the upper armatures of relay 921. Relay 915, however, responds to the speech signal and shunts down relay 918, relay 917 remaining operated. When the speech signal ceases, relay 817 is fully operated to perform the same functions hereinbefore ascribed thereto, including the release of relay 825. With relay 825 released, relay 922 is no longer shunted and this relay operates in parallel with relay 921 to ground at the front contact and second right armature of relay 910. When the next tone signal is transmitted from the call announcer tape corresponding to transformer 3, relay 915 operates to cause the reoperation of relay 918. When this tone signal ceases, relay 915 is deenergized and relay 917 reoperates. When the speech signal corresponding to the tens digit "3" is transmitted over the transmission channel 802—803 from the call announcer transformer 3, relay 915 reoperates and relay 918 releases. When this speech signal ceases relay 915 releases as do also relays 917 and 817. Relay 822, which was initially energized on the last operation of relay 917 now fully operates to extend the announcing channel 802—803 to the units control relay circuit 824 by way of conductors 820 and 821. When the next tone signal from the call announcer tape corresponding to the units digit "4" is transmitted over the announcing channel by way of the call announcer transformer 4, relay 915 again operates causing relay 918 to operate. When this tone signal ceases, relay 915 releases causing the reoperation of relay 917 which initiates the operation of relay 825. When the speech signal corresponding to the digit "4" is transmitted, relay 915 reoperates causing the release of relay 918. When the speech signal ("four") ceases, relay 915 releases as do also relays 917 and 822. Relay 825 fully operates causing relay 921 to be shunted down thus reestablishing the continuity of the paging channel PL at the upper armature contacts of relay 921. The cycle of operations just described is carried on with the transmission channel open at the upper armatures of relay 921 so that the speech signals corresponding to digits "2," "3" and "4" though transmitted from the corresponding call announcer tapes by way of transformers 2, 3 and 4 are not reproduced in the loudspeakers 127 and 128 of section No. 56. The time consumed during this cycle of operations is utilized to provide a time interval between successive pagings of the call registrant's number "234."

The second paging cycle starts with relays 817, 822, 915, 917 and 918 in their released positions and with only relays 825 and 922 operated. The broadcasting of the called registrant's registry number "234" for the second time is accomplished in exactly the same manner as it was the first time as previously described. After the transmission of the hundreds digit "2" for the second time relays 915, 917 and 918 will be released and relay 817 will fully operate in a manner now apparent. The operation of relay 817 releases relay 825 which opens the operating circuit for relay 922.

Just prior to the end of the first spacing interval, relay 921 released while relay 922 remained operated until released by relay 825. During this interval relay 927 operated initially in a circuit extending from grounded battery, upper winding of relay 927, back contact and upper armature of relay 927, back contact and second upper armature of relay 928, third lower armature and front contact of relay 922, back contact and second lower armature of relay 921, to ground at the front contact and second right armature of relay 910. Relay 927, after an interval of time closes its lower armature contacts and then fully operates over both its windings in series to ground at the first right armature and front contact of relay 910 by way of the second lower armature and back contact of relay 928.

Near the end of the second spacing interval relays 921 and 922 are again found operated. Under this condition relay 928 operates and locks to ground as did relay 927. Relay 928, operated, opens the locking circuit for relay 927 permitting this relay to release. At its inner upper armature and front contact, relay 928 prepares an operating circuit for relay 908 which circuit is completed when relay 921 operates the first time at the beginning of the third spacing interval. Relay 908 operated, locks to ground at the front contact and first right armature of relay 910.

It has thus far been described how, in response to the initiation of a call at a station CP to a registrant who has last registered in section No. 56 and whose call number is "2—234," the registrant's registry number "234" has been broadcast three times from the loudspeakers 127 and 128 in section No. 56 and how, after the third paging cycle relay 908 operates and locks.

When relay 908 operates after the third paging of the called registrant's registry number "234" in section No. 56, relay 902 restores its armatures since the locking circuit for this relay is now open at the outermost armature and back contact of relay 908. At its third lower armature relay 902 removes ground from conductor 526 thereby causing the deenergization of relay 513 in the section finder SF and of off-normal relay 910 in the page control circuit. These relays thereupon release.

At its left armature relay 910 disconnects the induction coil 912 from the tip and ring conductors extending to the calling station CP. This simulates the restoration of the telephone to its support at a called station. At its second right armature relay 910 removes ground from conductor 811 thereby releasing relays 921, 922, T1, T2 and U4 (not shown) and restoring the page control circuit to normal condition.

The release of relay 512 in the section finder SF, as described, closes a circuit in which release magnet 505 operates. This circuit extends from grounded battery, winding of release magnet 505, contacts 528 of vertical off-normal springs VON, third armature and back contact of relay 511, back contact and third armature of relay 513, back contact and third armature of relay 501, contacts 524 of springs VON to ground. Relay 503 is held operated until the section finder SF returns to normal. The release magnet 505, operated, permits the finder switch to return to normal at which time 524 and 528 of springs VON are opened thus opening the circuit to relay 503 and to the release magnet 505. Thus the section finder circuit is restored to normal condition.

*Call picked up by registrant No. 234*

Figure 11:
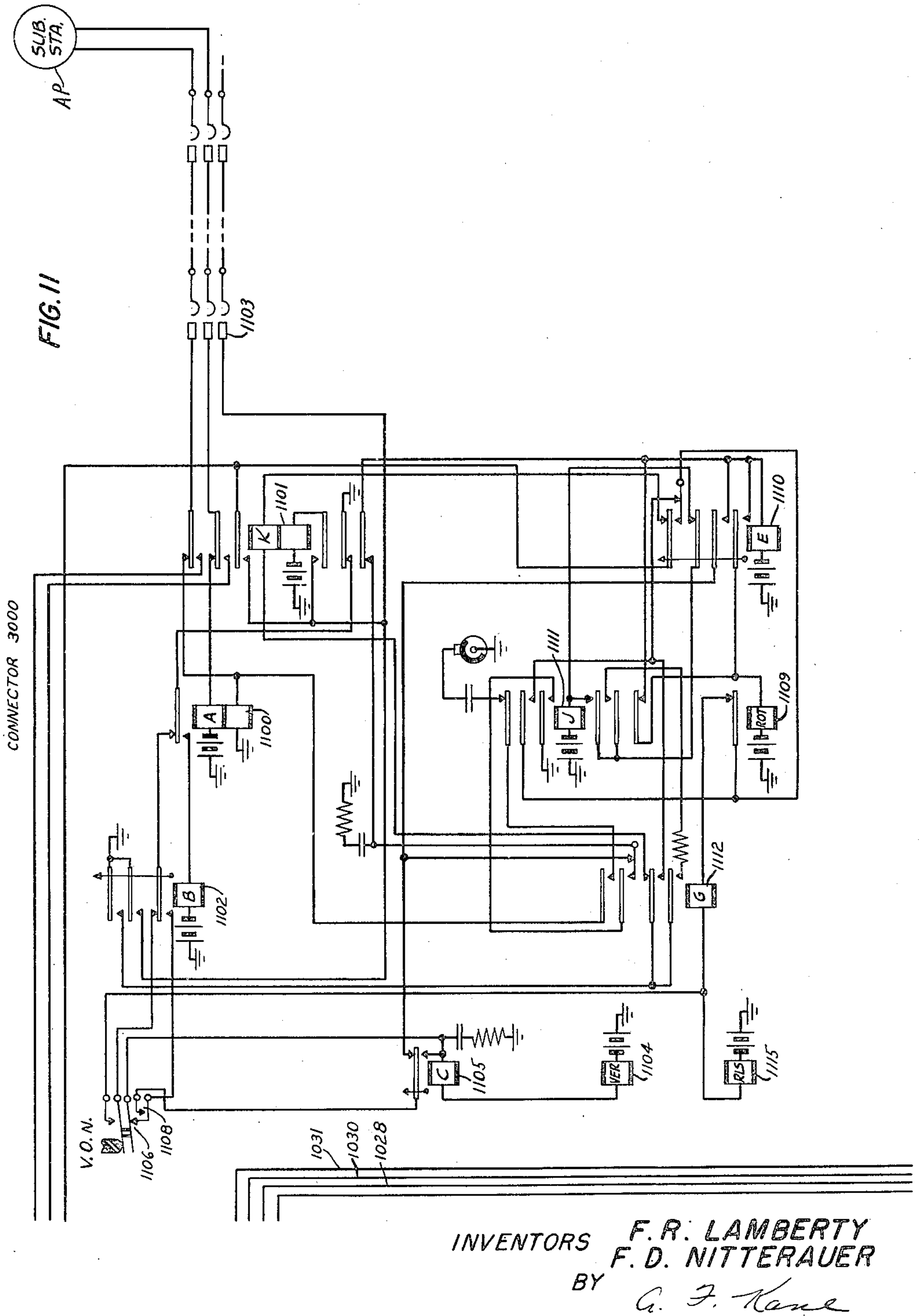
Fig. 11 is a diagrammatic representation of a connector circuit which is employed in extending a station, from which a called registrant answers a call, to the line terminals associated with the connector over which a call was extended to his line circuit.

Upon hearing the broadcasting of his code number "234" in section No. 56, the registrant may answer the call from any convenient telephone station in the building. It will be assumed that the registrant answers the call from station AP (Fig. 11) by dialing thereat his code number "234" preceded by the numeral "3." This number "3—234" is the called registrant's answer number.

When in response to the dialing of the first two digits of the registrant's answer number "3—234," the originated call is extended over the usual switches (schematically shown at the right of Fig. 11) to the 3000 connector, relay 1100 operates over the answering station loop in a circuit which includes the second and third upper armatures and back contacts of relay 1101. Relay 1100, operated, establishes an obvious operating circuit for slow releasing relay 1102. At its middle armature and front contact relay 1102 connects ground to the sleeve terminal 1103 to hold the preceding switches operated. At its third armature and front contact relay 1102 provides a ground for the upper winding of relay 1101, and at its first armature and front contact it prepares an operating circuit for vertical magnet 1104. This circuit may be traced from grounded battery, winding of vertical magnet 1104, winding of relay 1105, contacts 1106 of the vertical off-normal springs VON, front contact and first armature of relay 1102, back contact (now open) and armature of relay 1100, to ground over the back contact and second lower armature of relay 1101.

At each interruption of the dial at the answering station AP during the dialing of the third digit "3" of the answer number "2—234," relay 1100 releases its armature and operates the vertical magnet 1104 in series with the winding of relay 1105, relay 1105 operating on the first impulse. The vertical magnet steps the connector brushes up to the desired third level. Relays 1102 and 1105 are slow releasing and hold operated during dialing. On the first step of the switch the off-normal springs VON transfer the pulsing circuit from the contacts 1106 to the contacts 1108. Relay 1105 being operated, maintains the pulsing circuit through the vertical magnet 1104 for the balance of the pulses of the digit "3."

When the impulses from relay 1100 cease, relay 1105 releases and transfers the pulsing circuit from the vertical magnet 1104 to the rotary magnet 1109, in parallel with the winding of relay 1110. On the next series of four interruptions from the dial at station AP, relay 1100 releases and operates the rotary magnet 1109, relay 1110 operating on the first impulse. The circuit for rotary magnet 1109 may be traced from grounded battery, winding of rotary magnet 1109, back contact and third lower armature of relay 1111, third lower armature and back contact of relay 1101, normal make-before-break contacts of relay 1112, back contact and armature of relay 1105, contacts 1108 of springs VON, front contact and first armature of relay 1102, back contact and armature of relay 1100, back contact and second lower armature of relay 1101, to ground. Relay 1110, like relay 1105 is slow releasing so as to hold operated during dialing.

The rotary magnet 1109 steps the connector shaft and brushes around to the terminals LTA of the 3000 connector, the tip and ring terminals 732 and 733 of which are connected in multiple with the corresponding terminals 716 and 724 of the 2000 connector and which correspond to the line circuit of the registrant No. 234. As hereinbefore described, relay 704 in the registrant's line circuit was operated incident to the actuation of key 708 by the registrant when he left his telephone to go to section No. 56. With relay 704 operated and upon the seizure of the line circuit by the 3000 connector relay 711 in the line circuit operates in a circuit which extends from grounded battery, winding of relay 711, front contact and upper armature of relay 704, terminal 734 and brush 735 of the 3000 connector, fourth armature and back contact of relay 1110, which relay releases when dialing ceases, upper winding of relay 1101, back contact and second armature of relay 1112, to ground at the front contact and third armature of relay 1102. At its lower armature relay 711 opens the circuit to relay 773 causing this relay to release if it had not already released after three pagings.

At its lower armature relay 711 also opens the circuit to relay 617 in the identifier circuit ID allowing this relay to release. Relay 617, released, causes release magnet 606 to operate in a circuit which extends from grounded battery, winding of release magnet 606, contacts 633 of springs VON, third armature and back contact of relay 612, back contact and third armature of relay 617, back contact and third armature of relay 605, to ground at contacts 614 of springs VON. The release magnet 606 allows the identifier switch ID to restore to normal and when the shaft reaches its normal position the circuit to release magnet 606 is opened at the off-normal springs VON. With the release of the identifier switch the connection therefrom to the tip and ring conductors 618 and 619 of the line circuit is opened.

When relay 1101 in the 3000 connector was energized over its upper winding in series with the winding of relay 711, as described, it operated sufficiently to close its innermost lower armature contacts thereby energizing its lower winding to ground at the front contact and second armature of relay 1102. Relay 1101 then fully operates and locks to ground on the sleeve terminal 1103 of the preceding switch. At its second and third upper armatures and front contacts relay 1101 closes through the ring and tip conductors from the answering station AP to the brushes 736 and 737 of the connector and opens the energizing circuit for relay 1100. Relay 1100 releases as does also relay 1102.

A communication connection is now completed from the answering station AP to the calling station CP by way of the second and third upper armatures and front contacts of relay 1101, brushes 736 and 737 and corresponding terminals 732 and 733 of the 3000 connector, terminals 716 and 724 and corresponding brushes 717 and 723 of the 2000 connector, conductors 1030 and 1031, second upper and first lower armatures and front contacts of relay 1010, second and third upper armatures and front contacts of relay 1014, condensers 1020 and 1021, terminals 1018 and 1019 and corresponding brushes 1022 and 1023 of the last selector and over the tip and ring conductors of the calling station CP. Talking battery is supplied to the answering station AP over the windings of relay 1009 and to the calling station CP over the windings of relay 1000, it being understood that when the connection is cut through to the station AP, relay 1009 operates over the closed station loop.

The party at the calling station CP may now converse with the registrant No. 234 at the answering station AP.

It will be observed that during the paging of the called registrant No. 234 in section No. 56, a parallel transmission circuit for the paging pronouncements extends to the calling station CP so that the party who initiates the call may hear the pagings. This parallel circuit may be traced from the two upper armatures of relay 921, the first and second upper armatures and back contacts of relay 903, condensers 930, conductors 931 and 932, lower armatures and back contacts of relay 933, resistances 934 and 935, conductors 624 and 625, fourth and fifth armatures and front contacts of relay 617, second and third upper armatures and back contacts of relay 615, the brushes 627 and 636 and corresponding terminals 621 and 620 of the identifier switch ID, conductors 618 and 619, the terminals 716 and 724 and corresponding brushes 717 and 723 of the 2000 connector, conductors 1031 and 1030, second upper and first lower armatures and front contacts of relay 1010, second and third armatures and front contacts of relay 1014, condensers 1020 and 1021 and out over the tip and ring conductors of the established connection to the calling station over the selector terminals 1018 and 1019 and the corresponding brushes 1022 and 1023.

At the termination of the conversation between the party at station CP and the registrant No. 234 at station AP the receiver at station CP is restored to its mounting. Relay 1000 thereupon releases, in turn releasing relay 1001. Relay 1001 released, opens the locking circuit for relay 1010. On the release of relays 1000, 1001 and 1010 the release magnet 1003 is energized in a circuit extending from grounded battery, winding of release magnet 1003, contacts 1016 of springs VON, second lower armature and back contact of relay 1010, back contact and first armature of relay 1001, to ground at the back contact and armature of relay 1000. The operation of release magnet 1003 in this circuit allows the 200 connector shaft to return to normal. When the switch is returned to normal the circuit to release magnet 1003 is opened and the 2000 connector circuit is in its normal condition.

When the registrant at station AP restores the telephone to its support ground is removed from the sleeve terminal 1103 of the last selector in the usual manner causing relay 1101 to release. With relay 1101 released, release magnet 1115 operates to restore the connector to normal condition.

*Visual paging*

Figure 12:
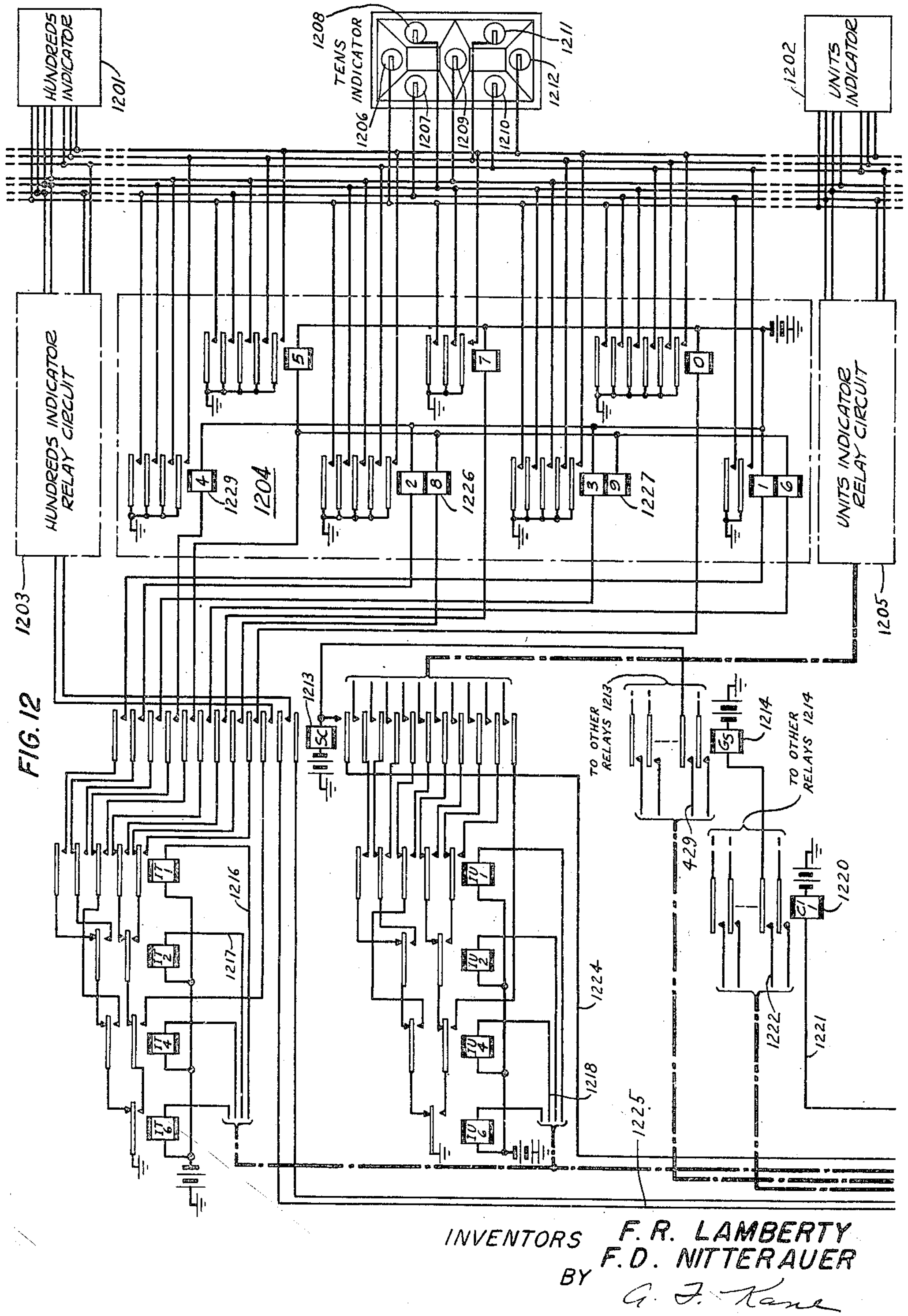

In the preceding description it has been demonstrated that when a call to a registrant, such as registrant No. 234, is originated at a calling station CP by the dialing of the registrant's call number "2—234", the called registrant's registry number "234" was caused to be repeated three times in section No. 56 in which section the called registrant had last registered. Provision is made whereby this audible paging of the called registrant is supplemented by a visual display of the called registrant's registry number in the section in which he last registered. For this purpose each section is provided with a visual indicator or signaling device which under suitable controls displays the called registrant's registry number. While such an indicator may be of any suitable design there is schematically illustrated at the right of Fig. 12, by way of example, three indicators of the "carriage call" type, one 1201 identified as the hundreds indicator, another 1200 designated the tens indicator and a third 1202 identified as the units indicator. Based on the assumption that the registrants covered by the system of this invention are assigned three-digit registry numbers there will be three such indicators per section, each controlled to display a different one of the three digits of the registry numbers. The hundreds and units indicators 1201 and 1202 are shown in block diagram whereas the tens indicator 1200 is illustrated schematically in detail. Each indicator is provided with its own individual indicator relay circuit, the same being designated in Fig. 12 by the numerals 1203, 1204 and 1205. Each of these relay circuits includes seven relays which operate in various combinations in a manner to be described to cause the lighting of corresponding indicator lamps. As is well known, the lamps in each indicator are so located with respect to individually corresponding translucent indicator sections or windows that when lighted in various combinations they cause illuminated outlines of corresponding digits to be displayed. Each indicator houses seven lamps 1206, 1207, 1208, 1209, 1210, 1211 and 1212 distributed as illustrated in Fig. 12. It is obvious that when lamps 1206, 1208, 1209, 1210 and 1212 are lighted the outline of the digit "2" is displayed; that when lamps 1206, 1208, 1209, 1211 and 1212 are lighted the illuminated outline of the digit "3" appears on the indicator; that when lamps 1207, 1208, 1209 and 1211 are ligted the illuminated outline of the digit "4" is displayed; and so on. Any of the digits 1 to 9 and zero may be displayed through the media of certain combinations of the seven lamps of any one indicator.

Any group of three indicators (combined to effect a single three-digit number display) of a section is selected for operation under control of relays 1213 and 1214 and the digits displayed by a selected group of indicators is determined by the tens indicator relays IT6, IT4, IT2 and IT1, the units indicator relays IU6, IU4, IU2 and IU1, and the two outermost upper armatures of relay 1213 which are controlled by relay 801, Fig. 8, of the paging control circuit. The tens and units indicator relays are controlled from corresponding tens and units relays of Fig. 8 in a manner to be described presently.

Figure 6:
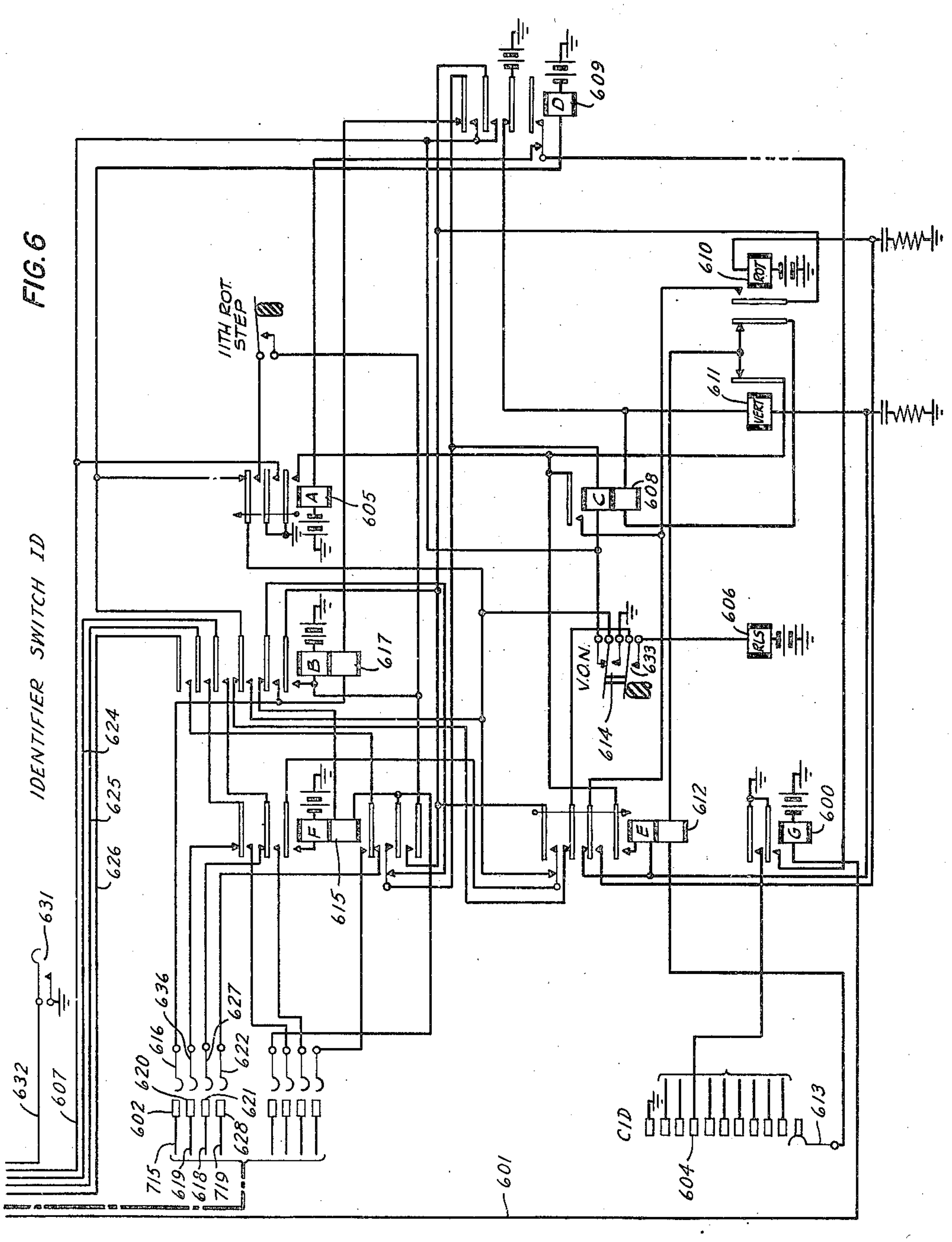
Fig. 6 is an identifier switch ID which functions automatically to locate the called line of a particular registrant when a call to the registrant is originated at a local extension station.

It will be recalled that incident to the operation of the line identification relay 718 associated with the line circuit CL of the called registrant No. 234 the tens control relays T1 and T2, the units control relay U4 (not shown), (Fig. 8), are operated. It will also be recalled that relay 801 operated under control of the normal post springs 631 of the identifier switch ID (Fig. 6). Relays T1 and T2, operated, register the tens digit "3," relay U4, the units digit "4" and relay 801, the hundreds digit "2" as previously described. It will also be recalled that the register circuit C (Fig. 3) individual to the called registrant No. 234 has stored therein information to the effect that registrant No. 234 last registered in section No. 56.

When relays T1, T2 and U4 (Fig. 8) operated, as described, they completed operating circuits for relays IT1, IT2 and IU4 (Fig. 12). The operating circuit for relay IT1 extends from grounded battery, winding of relay IT1, conductor 1216, front contact and outermost lower armature of relay T1 to ground. The operating circuit for relay IT2 extends from grounded battery, winding of relay IT2, conductor 1217, front contact and outermost lower armature of relay T2 to ground. The operating circuit for relay IU4 extends from grounded battery, winding of relay IU4, conductor 1218, front contact and outermost lower armature of relay U4 (not shown) which is similar to relay T4 illustrated. Thus when relays T1, T2 and U4 associated with the audible paging equipment (Fig. 4) operate incident to the seizure of line CL (Fig. 7), corresponding relays IT1, IT2 and IU4 associated with the visual paging equipment (Fig. 12) operate.

When relay 900 (Fig. 9) operated, as previously described, an operating circuit for relay 1220 was completed which includes grounded battery, the winding of relay 1220, conductor 1221, first right armature and front contact of relay 900, and ground. Relay 1220 controls the operation of six relays similar to relay 1214 illustrated, and which of the six relays which operates as a result of the operation of relay 1220 is determined by which combination of relays 302, 303 and 304 in the register circuit C (Fig. 3) is operated. It will be recalled that relays 302 and 304 are operated at this time, so that ground at the ninth armature and front contact of identification relay 718 is extended over conductor 720, outer armature and front contact of relay 302, middle armature and back contact of relay 303, second armature and front contact of relay 304, conductor 431, conductor 1222, front contact and second armature of relay 1220, winding of relay 1214, to battery and ground. Relay 1214 is the one of six similar relays which is selected and operates.

Relay 1214 controls the operation of ten section relays such as relay 1213, and which of these relays which responds to the operation of relay 1214 is determined by which of the select magnets, such as 224, of cross bar switch CB (Fig. 3) is operated at this time. It will be recalled that select magnet 224 operated to close contacts 308 and 309 which contacts remain closed under control of the hold magnet 305. With cross bar switch contacts 308 closed, ground at the outermost lower armature and back contact of busy test relay 903 (Fig. 9) is extended over conductor 999, outermost right armature and front contact of relay 900, conductor 998, sixth armature and front contact of relay 749 (Fig. 7), front contact and sixth armature of identification relay 718, conductors 997 and 428, contacts 308 of cross bar switch CB (Fig. 3), conductor 429 (extending upwardly to Fig. 12), front contact and second armature of relay 1214, winding of relay 1213, to battery and ground. Relay 1213 is individual to section No. 56 and its selection for operation has been controlled by the information stored in the register circuit C.

Relay 1213 operated, at its front contact and innermost lower armature locks to ground at the front contact and second left armature of off-normal relay 910 by way of conductors 1224 and 811. At its second upper armature and front contact relay 1213 extends conductor 1225, which is now grounded at the outermost upper armature and front contact of relay 801, to the hundreds indicator relay circuit 1203 wherein it is connected to grounded battery through the upper winding of a relay, corresponding to relay 1226 of the tens indicator relay circuit 1204. Thus this relay, which is herein identified as relay 1226′, operates.

With relays IT2 and IT1 and 1213 operated as described, relay 1227 in the tens indicator relay circuit 1203 operates over an obvious circuit. Similarly, with relays IU4 and 1213 operated an obvious operating circuit for a relay in the units indicator relay circuit 1205 corresponding to relay 1229 of the tens indicator relay circuit is completed and this relay, which is herein identified as relay 1229′ operates. The operated relays 1226′ (not shown), 1227 and 1229′ (not shown) of the hundreds, tens and units indicator relay circuits 1203, 1204 and 1205, respectively, control the illuminated display of the digits 2, 3 and 4 in the hundreds, tens and units indicators 1201, 1200 and 1202, respectively.

In order to simplify the description of the lighting of the various lamps in the three indicators 1201, 1200 and 1202, a description of the operation of those lamps in the tens indicator which cooperate in illuminating an outline of the tens digit "3" of the called registrant's registry number "234" will be made first. With relay 1227 in the tens indicator relay circuit 1204 operated, obvious energizing circuits for indicator lamps 1206, 1208, 1209, 1211 and 1212 are completed. These lamps, as illustrated, are located in such positions in the tens indicator 1200 as to cause an outline of the numeral "3" to be illuminated.

Relay 1227′ (not shown) in the hundreds indicator relay circuit 1203 and relay 1229′ (not shown) in the units indicator relay circuit 1205 correspond respectively to the illustrated relays 1227 and 1229 in the tens indicator relay circuit 1204, are provided with the same numbers of contacts, and control the lighting of corresponding lamps. Thus when relay 1226′ operates in the hundreds indicator relay circuit 1203, lamps in the hundreds indicator 1201 corresponding to lamps 1206, 1208, 1209, 1210 and 1212 of the tens indicator 1200 are lighted to effect the illuminated outline of the hundreds digit "2" of the called registrant's registry number. Similarly, when relay 1229' of the units indicator relay circuit 1205 operates, lamps in the units indicator 1212 corresponding to lamps 1207, 1208, 1209 and 1211 of the tens indicator 1200 are lighted to effect the illuminated outline of the units digit "4" of the called registrant's number. Thus the three indicators 1201, 1200 and 1202 in Section No. 56 combine to display the registry number "234" as a result of the initiation of a call to registrant No. 234 at the calling station by the dialing of the registrant's call number 2—234.

The registry number displayed by the indicators remains in evidence until the three audible pagings of the registrant have been completed unless effaced by the answer of the called registrant before the three pagings have been completed.

When a registrant has terminated his business at the hospital and is taking his leave of the building, he will pass through the "exit" section and dial his registry number at the exit dial station. To avoid unnecessary repetition it will be assumed that the registry selector switch A of Fig. 1 is allocated to the exit section and that the departing registrant No. 234 employs the dial 100 in "dialing out". It is believed unnecessary to repeat in detail the results of the dialing of the registry number "234" by means of the dial 100 since these results have been fully described hereinbefore. It will be assumed that the registrant has dialed the three digits 2, 3 and 4 and that the registry selector A and a register connector circuit such as B has responded thereto in the manner previously described.

When the last series of four pulses has been transmitted relay 208 (Fig. 2) releases and completes an operating circuit for chain relay 209. Relay 209 operates and causes relay 230 to operate as previously described. Relay 301 of the register circuit C operates incident to the operation of relay 230 as does also relay 115 in the register selector circuit A. Relay 301 operated, releases hold magnet 305 which, in turn, releases whichever of relays 302, 303 and 304 may have been operated. Thus the information as to the location in which registrant No. 234 last registered is no longer stored in the register circuit C. With the release of hold magnet 305 the register lamp 300 is extinguished.

Incident to the release of hold magnet 305 relay 219 in the register connector circuit B operates and completes an operating circuit for relay 241 which may be traced from grounded battery, resistance 223, outer armature and front contact of relay 219, front contact and outermost armature of relay 230, selector terminal 120 and brush 112, upper armature and front contact of relay 115, conductor 130, to ground through the winding of relay 241. It will be observed at this point that relay 241 is individually associated with the registry selector circuit assigned to the exit section and that relay 222 is not connected to the conductor 130 extending to this selector.

Relay 241, operated, releases relay 230 which permits relay 212 to operate and cause relays 301 and 115 to release. Register lamp 121 at the exit dial station now lights as an indication to the registrant that the exit dialing operation has been registered. It is apparent that when the lamp 300 is extinguished incident to the dialing of the registry number 234 from the exit station, it is not relighted as in the case previously described in connection with the dialing of the registry number from section No. 56.

The jack J shown on Fig. 7 is employed by the private branch exchange attendant in manually completing central office calls to stations such as the station associated with the line circuit CL. Should such a call be extended to the station on line CL while the key 708 is in its normal unoperated position relay 701 would operate over the sleeve of the cord associated with jack J. Relay 701 operated, cuts through the tip and ring conductors through to the station 700 in the well-known manner.

Should relay 704 be operated because of the operation of key 708 at station 700 the called party would be paged in the same manner as on a call through the 2000 connector (Fig. 10) as previously described.

The line finder LF shown on Fig. 7 is employed in the extension of calls originated at the station 700 in the well-known manner.

*Registrant with fixed assignment*

Figure 13:
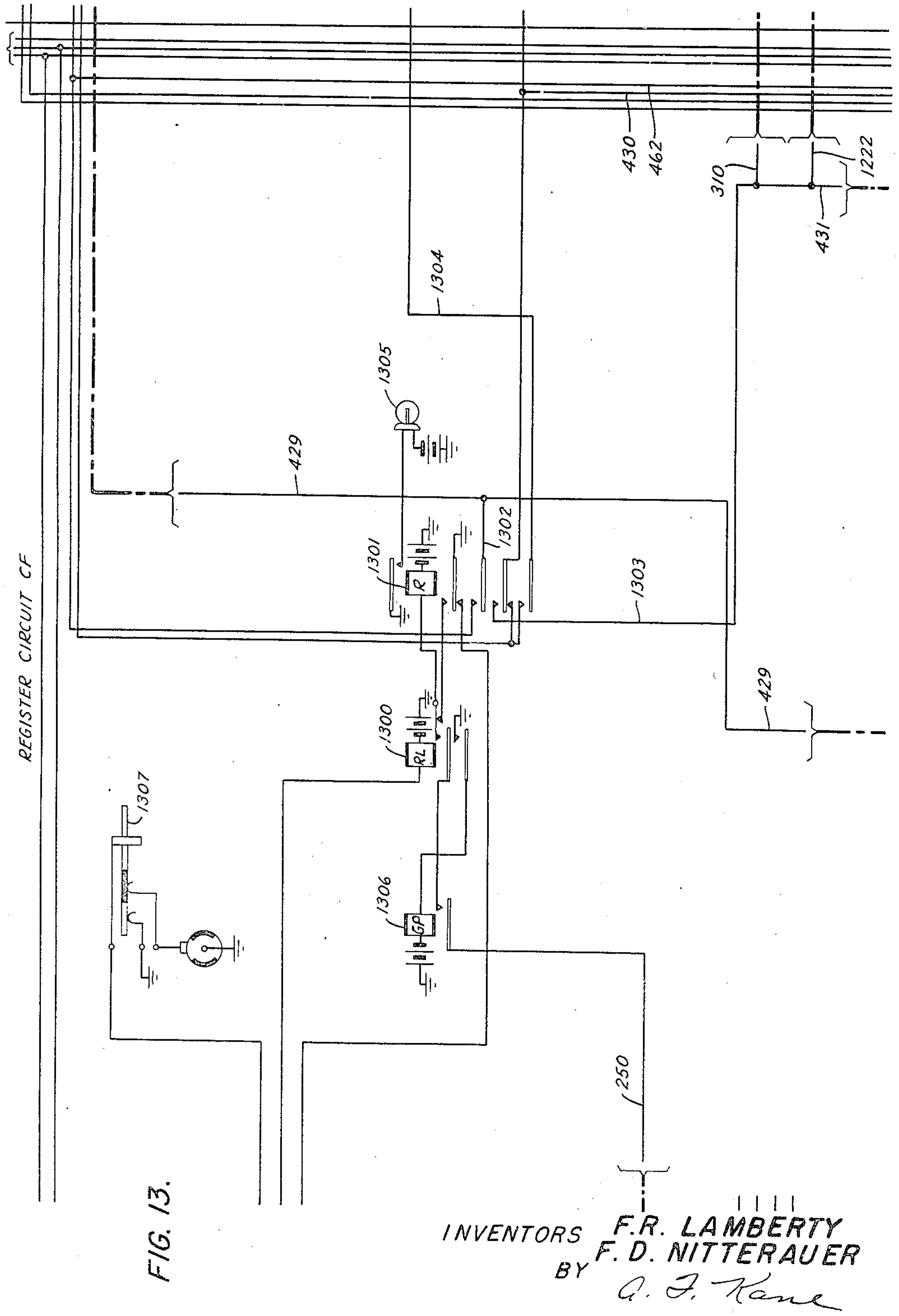
Fig. 13 illustrates a register circuit of the type assigned to registrants having fixed assignments.

Thus far the description has been concerned only with registrants having roving assignments. Fig. 13 illustrates, diagrammatically, a register circuit CF which is individually allocated to a registrant who has a fixed assignment and corresponds to the register circuit C of Fig. 3 which is individually allocated to a registrant having a roving assignment. The registration of a person with a fixed assignment is recorded on a relay circuit comprising, essentially, relays 1300 and 1301 with leads such as 1302, 1303 and 1304 cross-connected, as required, to indicate the assigned section. It will be noted at this time that while the registrant may dial from any section he will be registered in the section to which he has been assigned.

In order to simplify the description dealing with the registration of a registrant having a fixed assignment it will be assumed that registrant No. 234 has been assigned to section No. 56. It will be observed that the register circuit CF has been identified in the register connector circuit B (Fig. 2) by the bank terminals 227, 216 and 220 so that incident to the dialing of the registrant's number "234" at a section which is served by the register connector B the terminals 227, 216 and 220 will be engaged by corresponding connector brushes 226, 217 and 221 in a manner fully described hereinbefore.

Relay 1300 now operates in a circuit extending from grounded battery, through the winding of relay 1300, terminal 216 and brush 217 of the registry connector B, front contact and third armature of relay 202, back contact and inner upper armature of relay 212, front contact and third armature of relay 230 to ground. Relay 115 (Fig. 1) is also operated under control of relay 230. Relay 1300 at its first armature and front contact opens the locking circuit for relay 1301 which relay however is not now operated since a registrant with a fixed assignment is required to register but once, either at the building entrance or at his assigned section.

At its outer armature and front contact relay 1300 causes relay 1306 to operate and extend the operating circuit of relay 1301 to conductor 250 which obtains ground from the outer right armature and front contact of relay 222 (Fig. 2), when relay 222 operates. Relay 219 (Fig. 2) now operates in a circuit which may be traced from grounded battery, winding of relay 219, front contact and first armature of relay 230, outermost armature and front contact of relay 202, brush 221 and engaged terminal 220 of the registry connector B, back contact and lower armature of relay 1301 to ground. Relay 222 now operates in a circuit extending from grounded battery, resistance 223, outer armature and front contact of relay 219, front contact and outermost armature of relay 230, terminal 120 and brush 112 of registry selector A (Fig. 1), upper armature and front contact of relay 115 (it being understood that relay 115 is operated at this time), conductor 130, winding of relay 222 to ground.

Relay 222 at its lower armature and front contact connects ground to conductor 250 causing relay 1301 to operate and light the register lamp 130 and to remove a short circuit from relay 212. Relay 212 now operates in series with relay 219 causing chain relay 209 to restore which, in turn, causes relay 230 to be deenergized. Relay 1300 releases incident to the operation of relay 212 causing relay 1306 to restore its armature and relay 1301 to lock in an obvious circuit.

Figure 2:
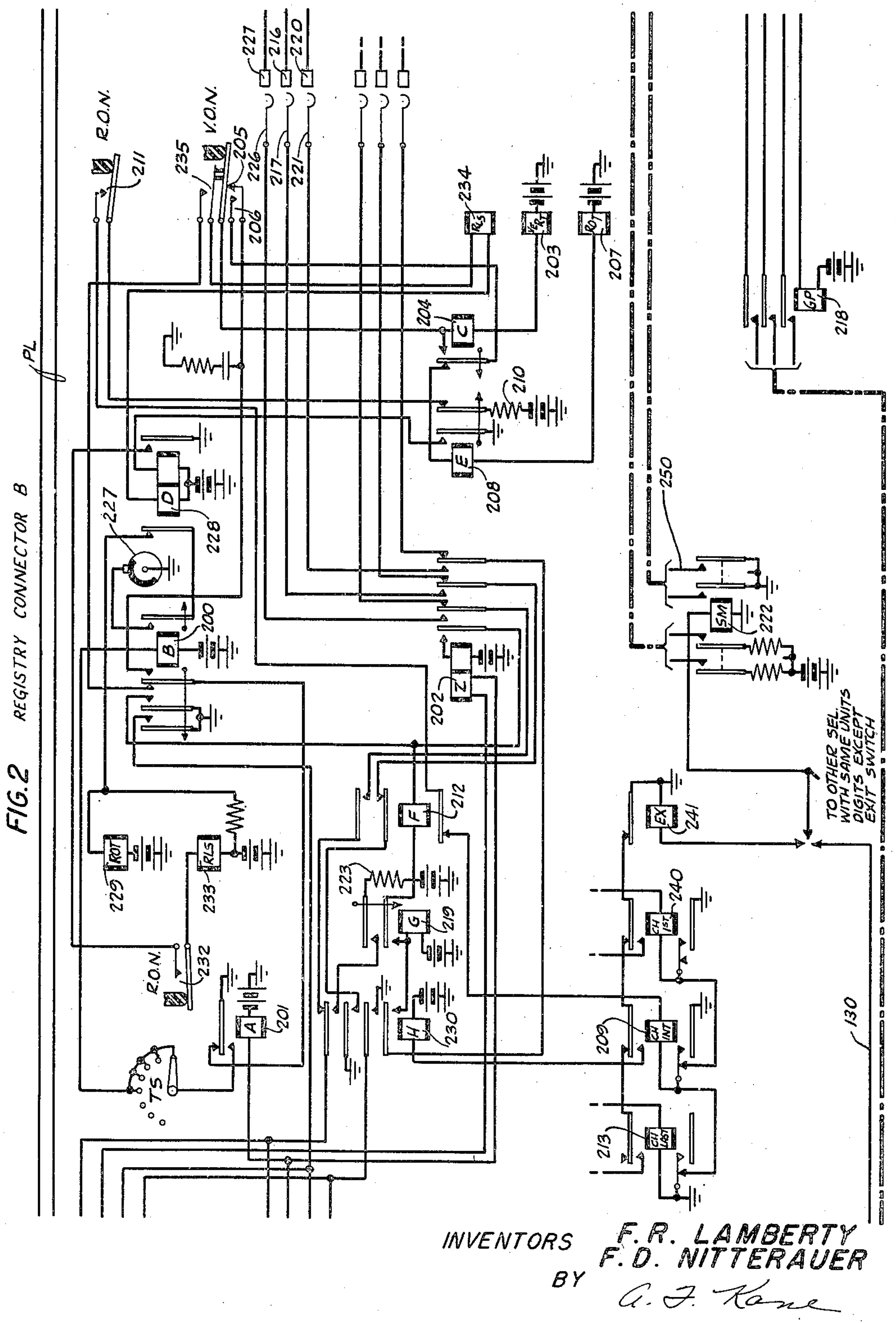

With relay 230 in Fig. 2 released, relay 115 in Fig. 1 releases causing the register lamp 121 at the section dial station employed by registrant No. 234 to be lighted in a circuit which is apparent, to indicate to the registrant that his dialing operation has been registered.

It may be well to observe at this time that lamp 121 at the dial station in section No. 56 would flash intermittently incident to the registration of the registrant thereat, had the flash key 1307 corresponding to the lamp 1305 at the attendant's switchboard been operated, for a purpose hereinbefore described.

When relay 1301 operated, as previously described, it completed a number of circuits by way of its second, third, and fourth lower armatures which will now be described.

Should an attendant, not knowing the section to which registrant No. 234 is assigned nor whether he has a permanent or roving assignment, wish to locate him, she would proceed as in the case hereinbefore described and dial the digits "2," "3" and "4" after having inserted the plug of her cord into jack 474 (Fig. 4) which terminates the locating selector LS at the exchange switchboard. The locating selector LS and the locating connector LC then function in the manner previously described to cause the setting of brushes 416 and 417 on the connector terminals 418 and 419, respectively, the latter identifying the register circuit CF it being observed that the conductors 430 and 462 connected to the connector terminals 418 and 419, respectively, connect with the third lower armature and the second lower armature contact, respectively, of relay 1301 and that the corresponding front contact and armature are connected to the conductors 429 and 431 extending to the display relay circuit (Fig. 4). Thus, with relays 426 and 427 operated as they would be incident to the operation of relay 425 in the locating connector LC, lamps T6 and U5 would be lighted at the private branch exchange switchboard. These lamps identify section No. 56 and when lighted, as described, appraise the switchboard attendant of the location of registrant No. 234. Should the attendant desire to page the registrant No. 234 she would then cause the seizure of the paging channel PL, which is individual to the section No. 56, by dialing the digits "5," "6" after having inserted the plug of her cord into the jack 434 which terminates the paging connector PC at the switchboard.

With relay 1301 held operated in the register circuit CF (Fig. 13) conductor 722, which is connected to the seventh armature of line identification relay 718 of the line circuit CL (Fig. 7) is connected to the bank terminal 506 of the section finder SF (Fig. 5). Similarly, conductor 720, which is connected to the front contact associated with the ninth armature of line identification relay 718, is connected to conductor 310 which is connected to segment 500 of the section finder commutator CF. Thus when line identification relay 718 of the line circuit CL (Fig. 7) operates on a call directed to registrant No. 234 over the 2000 connector (Fig. 10) in the manner previously described the section to which the registrant is assigned is marked in the section finder SF (Fig. 5).

It is further indicated in Fig. 13 that with relay 1301 operated conductors 429 and 1222 which extend to contacts of relays 1214 and 1220 in Fig. 12 are connected to conductors 997 and 720 to perform indicator control functions in the manner previously described. Thus it is that the register circuit CF (Fig. 13) serves a registrant having a fixed assignment in substantially the same manner as does the register circuit C (Fig. 3) serve a registrant having a roving assignment, the fundamental difference being that in the former the information stored therein is not altered in accordance with the location of the sections in which the registrant may dial his registry number whereas in the latter the stored information varies as the registrant visits the various sections of the hospital and registers therein. Obviously, therefore, a registrant having a roving assignment will be automatically paged in the section in which he last registered while a registrant having a fixed assignment will be paged in the section to which he has been assigned.

When the registrant with a fixed assignment leaves the building he is required to perform the same "exit dialing" operation performed by other registrants. Such operation will of course cause the lamp 1305 to be extinguished in a manner now apparent.

The flash key 1307 shown in Fig. 13 serves the same purpose as the flash key 306 shown in Fig. 3.

What is claimed is:

1. In combination, a plurality of dial stations, a switchboard having a dial, lamp signals at said switchboard operable in various combinations to identify said dial stations, and means responsive to the operation of the dial at one of said stations in a particular manner and to the subsequent operation of the dial at said switchboard in the same manner for operating the combination of said lamp signals which identifies the dial station at which the dial was operated.

2. The combination in a combined telephone and paging system for use in a multisection area, each section of which is identified by a numerical designation, of a telephone exchange in the area, a switchboard thereat having lamp signals operable in combinations indicative of the numerical designations of the area sections, a dial at said switchboard, a dial station in each section, and means responsive to the dialing of a number at a dial station and to the subsequent operation of the switchboard dial in accordance with the same number for operating the combination lamp signals indicative of the numerical designation of the section in which the dialing operation was performed.

3. In combination in a combined telephone and paging system for use in a multisection area, each section of which is numerically designated, a telephone switchboard in the area, means at said switchboard for identifying each section of the area, a dial at each section, a dial at said switchboard, and means responsive to the operation of the dial at any section in accordance with a particular number and to the subsequent operation of the dial at said switchboard in accordance with the same number for operating the identifying means at said switchboard corresponding to the section at which the dial was operated.

4. In combination in a combined telephone and paging system for use in a multisection area, each section of which is numerically designated, a telephone switchboard in the area, lamp signals at said switchboard for identifying each section of the area, a dial at each section, a dial at said switchboard, a register, means responsive to the operation of a section dial in accordance with a particular number for setting said register in a manner indicative of the numerical designation of the section at which the dial is operated, and means controlled by the dial at said switchboard when operated in accordance with the same particular number for operating lamp signals at said switchboard in accordance with the setting of said register.

5. In combination in a combined telephone and paging system for use in a multisection area, each section of which is numerically designated, a telephone switchboard in the area, a first group of lamp signals at said switchboard individual to the units digits of the numerical designations of said sections, a second group of lamp signals at said switchboard individual to the tens digits of the numerical designations of said sections, a dial at each section, a dial at said switchboard, a register, means controlled by a section dial when operated in accordance with a particular number for setting said register in accordance with the tens and units digits of the numerical designations of the section at which the dial is operated, and means controlled by the dial at said switchboard incident to its operation in accordance with the same particular number for operating a lamp in each of said first and second groups of lamps at said switchboard corresponding respectively to the tens and units settings of said register.

6. In a combined telephone and paging system in which a multiplicity of registrants may be selectively paged in sections of a multisection area and in which each registrant is identified by a registry number and by a call number, a dial station in each section of said multisection area, a paging channel for each section of said area, paging apparatus common to said paging channels, a calling station, and means controlled jointly by the dialing of a registrant's registry number at a particular dial station and the subsequent dialing of the registrant's call number at said calling station for automatically connecting said paging apparatus to the paging channel corresponding to the section in which the said particular dial station is located.

7. In a combined telephone and paging system in which a multiplicity of registrants may be selectively paged in sections of a multisection area and in which each registrant is identified by a registry number and a call number, a dial station in each section of said multisection area, a number display indicator in each section of said area, common control means for said indicators, a calling station, and means responsive to the dialing of a registrant's registry number at a particular dial station and to the subsequent dialing of the registrant's call number at said calling station for automatically connecting the indicator of the section in which the said particular dial station is located to said common control means.

8. In a combined telephone and paging system as defined in the preceding claim 7 in which means are provided whereby the control means operates to cause the connected indicator to display the registry number dialed at the said particular dial station.

9. In a combined telephone and paging system in which a multiplicity of registrants may be selectively paged in sections of a multisection area and in which each registrant is identified by a registry number and a call number, a dial station in each section of said multisection area, a call announcer, a paging channel for each section of said area, a calling station, and means responsive to the dialing of a registrant's number at a particular dial station and to a subsequent dialing of the registrant's call number at said calling station for automatically connecting said call announcer to the paging channel corresponding to the section in which the said particular dial station is located.

10. In a combined telephone and paging system in which a multiplicity of registrants may be selectively paged in sections of a multisection area and in which each registrant is identified by a multidigit registry number and a call number, a dial station in each section of said multisection area, a call announcer comprising tape-borne pronouncements of the digits of which a multi-digit number may be composed, a paging channel individual to each section of said area, terminating at its respective section in a loudspeaker, a calling station, and means responsive jointly to the dialing of a registrant's multidigit registry number at a particular dial station and to the subsequent dialing of the registrant's call number at said calling station for automatically seizing the paging channel corresponding to the section in which the said particular dial station is located and for causing the tape-borne pronouncements of said call announcer corresponding to the digits of the registrant's registry number to be transmitted over the seized paging channel and to be broadcast from the loudspeaker terminating it.

11. In a combined telephone and paging system, a called station, a calling station, paging equipment remotely located from said called station, means responsive to the initiation of a call at said calling station to said called station for signaling said called station, means located at said called station for substituting said paging equipment for said signaling means, and means for operating said paging equipment.

12. In a combined telephone and paging system, a called station having a numerical designation, a calling station, a number display indicator remotely located from said stations, control means for said indicator, means responsive to the initiation of a call at said calling station in accordance with the numerical designation of said called station for signaling said called station, and means located at said called station for disabling said signaling means at said called station and for rendering said indicator control means responsive to the initiation of a call at said calling station in accordance with the numerical designation of said called station whereby said indicator displays a number corresponding to the numerical designation of said called station.

13. In a combined telephone and paging system, a called station having a numerical designation, a number display indicator located remote from said station, and means at said station for causing calls directed to said station in accordance with the numerical designation thereof to bypass said station and to be manifested by said indicator.

14. In a combined telephone and paging system, a called station having numerical registry and call designations, a number display indicator located remote from said called station, means at said station for routing calls directed to said station in accordance with the numerical call number thereof to said indicator, and means effective incident to the direction of a call to said station subsequent to the operation of said call routing means for causing said indicator to display the registry number of said station.

FREDERICK R. LAMBERTY.
FRANKLIN D. NITTERAUER.

REFERENCES CITED

The following references are of record in the file of this patent:

UNITED STATES PATENTS

| Number | Name | Date |
|---|---|---|
| 1,308,958 | McFell | July 8, 1919 |
| 1,846,516 | Haines | Feb. 23, 1932 |
| 2,330,358 | Johnson | Sept. 28, 1943 |
| 2,335,524 | Lomax | Nov. 30, 1943 |
| 2,397,881 | Nitterauer | Apr. 2, 1946 |